(12) United States Patent  (10) Patent No.: US 9,051,162 B2
Peters et al.  (45) Date of Patent: Jun. 9, 2015

(54) SYSTEMS AND METHODS FOR FACILITATING CONSUMER-DISPENSER INTERACTIONS

(75) Inventors: Dan Peters, Alpharetta, GA (US); Son V. Tran, Alpharetta, GA (US); David R. Newman, Atlanta, GA (US); Leonard F. Antao, Smyrna, GA (US); David O. Slagley, Roswell, GA (US); H. Brock Kolls, Alpharetta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 948 days.

(21) Appl. No.: 12/204,494

(22) Filed: Sep. 4, 2008

(65) Prior Publication Data

US 2009/0070234 A1  Mar. 12, 2009

Related U.S. Application Data

(60) Provisional application No. 60/970,511, filed on Sep. 6, 2007, provisional application No. 60/970,513, filed on Sep. 6, 2007.

(51) Int. Cl.
*G06Q 30/00* (2012.01)
*B67D 1/00* (2006.01)
(Continued)

(52) U.S. Cl.
CPC ............ *B67D 1/0041* (2013.01); *B67D 1/0888* (2013.01); *G06Q 30/0601* (2013.01); *G07F 9/02* (2013.01); *G07F 11/002* (2013.01); *G07F 13/065* (2013.01); *B67D 2210/00089* (2013.01)

(58) Field of Classification Search
CPC ... A23F 5/243; B67D 1/0041; G06Q 30/0621
USPC ................ 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2; 426/433; 222/129.1
See application file for complete search history.

(56) References Cited

U.S. PATENT DOCUMENTS 3,991,911 A  11/1976 Shannon et al.
4,358,171 A  11/1982 Christen
(Continued)

FOREIGN PATENT DOCUMENTS

BE  1005369  6/1993
CN  1378432  11/2002
(Continued)

OTHER PUBLICATIONS

Michelle Juergen, "Startup Allows Customers to Design Their Own Soft-Drinks", Jul. 11, 2012. Retrieved from http://www.entrepreneur.com/article/223648.*

(Continued)

*Primary Examiner* — Naeem Haq
(74) *Attorney, Agent, or Firm* — Sutherland Asbill & Brennan LLP

(57) ABSTRACT

Embodiments of the invention can include systems and methods for consumer-dispenser interactions. In one embodiment, a product dispenser is provided. The product dispenser can include a user interface operable to interact with a consumer and receive at least one input from the consumer. The product dispenser can also include a controller comprising a set of instructions operable to receive a request from a consumer to dispense a custom product. In addition, the controller can further comprise a set of instructions operable to present via the user interface a at least one of a list of selectable product ingredients or adjustable product formulation parameters. Moreover, the controller can further comprise a set of instructions operable to dispense a product based at least in part on one or more of the selectable ingredients or selected formulation parameters.

24 Claims, 10 Drawing Sheets

(51) Int. Cl.
*B67D 1/08* (2006.01)
*G06Q 30/06* (2012.01)
*G07F 9/02* (2006.01)
*G07F 11/00* (2006.01)
*G07F 13/06* (2006.01)

(56) References Cited

U.S. PATENT DOCUMENTS

| | | |
|---|---|---|
| 4,525,071 A | 6/1985 | Horowitz et al. |
| 4,549,675 A * | 10/1985 | Austin ................ 222/129.1 |
| 4,563,739 A | 1/1986 | Gerpheide et al. |
| 4,732,300 A * | 3/1988 | Valiyee et al. .......... 222/144.5 |
| 4,819,176 A | 4/1989 | Ahmed et al. |
| 4,907,723 A * | 3/1990 | Katz ...................... 222/105 |
| 5,147,068 A | 9/1992 | Wright |
| 5,255,819 A | 10/1993 | Peckels |
| 5,312,017 A | 5/1994 | Schroeder et al. |
| 5,350,082 A | 9/1994 | Kiriakides, Jr. et al. |
| 5,358,145 A | 10/1994 | Smith et al. |
| 5,408,917 A * | 4/1995 | Lussi ...................... 99/281 |
| 5,603,430 A | 2/1997 | Loehrke et al. |
| 5,615,801 A | 4/1997 | Schroeder et al. |
| 5,691,684 A | 11/1997 | Murrah |
| 5,715,700 A | 2/1998 | Credle, Jr. |
| 5,735,436 A | 4/1998 | Schroeder et al. |
| 5,798,694 A | 8/1998 | Reber et al. |
| 5,839,610 A | 11/1998 | Reese et al. |
| 5,842,603 A | 12/1998 | Schroeder et al. |
| 5,884,807 A | 3/1999 | Yun |
| 5,997,924 A * | 12/1999 | Olander et al. ............ 426/296 |
| 6,053,359 A | 4/2000 | Goulet et al. |
| 6,116,460 A | 9/2000 | Kim et al. |
| 6,119,434 A | 9/2000 | Andersson |
| 6,131,399 A | 10/2000 | Hall |
| 6,152,591 A | 11/2000 | McCall et al. |
| 6,161,059 A | 12/2000 | Tedesco et al. |
| 6,238,721 B1 | 5/2001 | Knepler |
| 6,317,649 B1 | 11/2001 | Tedesco et al. |
| 6,354,468 B1 | 3/2002 | Riek |
| 6,377,868 B1 | 4/2002 | Gardner, Jr. |
| 6,378,275 B1 | 4/2002 | Andersson |
| 6,424,884 B1 | 7/2002 | Brooke et al. |
| 6,465,035 B1 | 10/2002 | Knepler |
| 6,470,233 B1 | 10/2002 | Johnson, Jr. |
| 6,479,086 B1 | 11/2002 | Knepler |
| 6,564,999 B1 | 5/2003 | Saveliev et al. |
| 6,572,016 B2 | 6/2003 | Saveliev et al. |
| 6,618,062 B1 * | 9/2003 | Brown et al. ................ 715/822 |
| 6,622,064 B2 | 9/2003 | Bartholomew et al. |
| 6,658,323 B2 | 12/2003 | Tedesco et al. |
| 6,688,134 B2 | 2/2004 | Barton et al. |
| 6,698,228 B2 | 3/2004 | Kateman et al. |
| 6,751,525 B1 | 6/2004 | Crisp |
| 6,756,069 B2 | 6/2004 | Scoville et al. |
| 6,759,072 B1 | 7/2004 | Gutwein et al. |
| 6,772,944 B2 | 8/2004 | Brown |
| 6,799,085 B1 | 9/2004 | Crisp |
| 6,807,460 B2 | 10/2004 | Black et al. |
| 6,907,741 B2 | 6/2005 | Kateman |
| 6,918,258 B2 | 7/2005 | Cunha et al. |
| 6,941,858 B2 | 9/2005 | Kateman |
| 6,968,876 B2 | 11/2005 | Yacko et al. |
| 6,973,478 B1 | 12/2005 | Ketonen et al. |
| 6,974,928 B2 | 12/2005 | Bloom |
| 6,980,886 B2 | 12/2005 | Shimoda et al. |
| 6,980,887 B2 | 12/2005 | Varga et al. |
| 6,982,640 B2 | 1/2006 | Lindsay et al. |
| 6,990,391 B1 | 1/2006 | Cunha et al. |
| 7,009,519 B2 | 3/2006 | Leonard et al. |
| 7,020,680 B2 | 3/2006 | Defosse |
| 7,028,861 B2 | 4/2006 | Sayers et al. |
| 7,031,804 B2 | 4/2006 | Brooke et al. |
| 7,032,818 B2 | 4/2006 | Thomas et al. |
| 7,053,773 B2 | 5/2006 | McGarry et al. |
| 7,065,429 B1 | 6/2006 | McClain et al. |
| 7,082,970 B2 | 8/2006 | Bartholomew et al. |
| 7,147,131 B2 | 12/2006 | Sher et al. |
| 7,151,982 B2 | 12/2006 | Liff et al. |
| 7,156,259 B2 | 1/2007 | Bethuy et al. |
| 7,161,494 B2 | 1/2007 | Akuzawa |
| 7,223,427 B2 | 5/2007 | Knepler |
| 7,231,279 B2 | 6/2007 | Ghidotti |
| 7,234,609 B2 | 6/2007 | DeLazzer et al. |
| 7,249,050 B1 | 7/2007 | Walker et al. |
| 7,331,483 B2 | 2/2008 | Bhimani et al. |
| 7,353,080 B2 | 4/2008 | Walker et al. |
| 7,387,239 B2 | 6/2008 | Thomas et al. |
| 7,391,318 B2 | 6/2008 | Higashi |
| 7,395,134 B2 | 7/2008 | Bartholomew et al. |
| 7,499,768 B2 | 3/2009 | Hoersten et al. |
| 7,499,769 B2 | 3/2009 | Walker et al. |
| 7,627,496 B2 | 12/2009 | Walker et al. |
| 7,640,755 B1 | 1/2010 | Kateman |
| 7,673,555 B2 * | 3/2010 | Nosler et al. .................. 99/279 |
| 7,912,579 B2 | 3/2011 | Stettes |
| 7,918,368 B2 | 4/2011 | Crisp et al. |
| 8,340,815 B2 | 12/2012 | Peters et al. |
| 2002/0059175 A1 | 5/2002 | Nakano |
| 2002/0065579 A1 | 5/2002 | Tedesco et al. |
| 2002/0077889 A1 | 6/2002 | Kolls |
| 2002/0116261 A1 | 8/2002 | Moskowitz et al. |
| 2002/0123926 A1 | 9/2002 | Bushold et al. |
| 2002/0129712 A1 * | 9/2002 | Westbrook et al. ............ 99/279 |
| 2002/0143626 A1 | 10/2002 | Voltmer et al. |
| 2002/0161653 A1 | 10/2002 | Walker et al. |
| 2002/0183893 A1 | 12/2002 | Brooke et al. |
| 2003/0010791 A1 | 1/2003 | Gentiluomo et al. |
| 2003/0032474 A1 | 2/2003 | Kaminkow |
| 2003/0083758 A1 * | 5/2003 | Williamson .................. 700/65 |
| 2003/0126964 A1 | 7/2003 | Ortega et al. |
| 2003/0129286 A1 | 7/2003 | Knepler |
| 2003/0191709 A1 | 10/2003 | Elston et al. |
| 2004/0044584 A1 * | 3/2004 | Chung ......................... 705/26 |
| 2004/0103033 A1 | 5/2004 | Reade et al. |
| 2004/0113786 A1 | 6/2004 | Maloney |
| 2004/0129720 A1 | 7/2004 | Cheng et al. |
| 2004/0226994 A1 | 11/2004 | Brown |
| 2004/0243259 A1 | 12/2004 | Peterson et al. |
| 2005/0003068 A1 * | 1/2005 | Kester et al. .................. 426/597 |
| 2005/0075900 A1 | 4/2005 | Arguimbau |
| 2005/0143857 A1 | 6/2005 | Chirnomas |
| 2005/0167493 A1 | 8/2005 | Barton et al. |
| 2005/0178144 A1 | 8/2005 | Crisp |
| 2005/0178793 A1 | 8/2005 | Cheng et al. |
| 2005/0182599 A1 | 8/2005 | Knepler et al. |
| 2005/0192705 A1 | 9/2005 | Pinney et al. |
| 2005/0205666 A1 | 9/2005 | Ward et al. |
| 2005/0258961 A1 | 11/2005 | Kimball et al. |
| 2005/0276883 A1 | 12/2005 | Jeffrey et al. |
| 2006/0000851 A1 | 1/2006 | Girard et al. |
| 2006/0043101 A1 | 3/2006 | Bhimani et al. |
| 2006/0043111 A1 | 3/2006 | Jennings et al. |
| 2006/0051614 A1 | 3/2006 | Su et al. |
| 2006/0054614 A1 | 3/2006 | Baxter et al. |
| 2006/0081653 A1 | 4/2006 | Boland et al. |
| 2006/0102645 A1 | 5/2006 | Walker et al. |
| 2006/0108415 A1 | 5/2006 | Thomas et al. |
| 2006/0111978 A1 | 5/2006 | Tietzen et al. |
| 2006/0115570 A1 | 6/2006 | Guerrero et al. |
| 2006/0115572 A1 | 6/2006 | Guerrero et al. |
| 2006/0131329 A1 | 6/2006 | Sayers et al. |
| 2006/0144244 A1 | 7/2006 | Girard et al. |
| 2006/0180647 A1 | 8/2006 | Hansen |
| 2006/0192003 A1 | 8/2006 | Chung |
| 2006/0224696 A1 | 10/2006 | King et al. |
| 2006/0247824 A1 | 11/2006 | Walker et al. |
| 2006/0261156 A1 | 11/2006 | Brown |
| 2006/0272922 A1 | 12/2006 | Hoersten et al. |
| 2007/0016852 A1 | 1/2007 | Kim et al. |
| 2007/0027576 A1 | 2/2007 | Juds et al. |
| 2007/0044820 A1 | 3/2007 | Chan et al. |
| 2007/0087756 A1 | 4/2007 | Hoffberg |
| 2007/0124204 A1 | 5/2007 | De Boer et al. |
| 2007/0252709 A1 | 11/2007 | Collins et al. |

(56) References Cited

U.S. PATENT DOCUMENTS

| | | | |
|---|---|---|---|
| 2007/0299555 A1 | 12/2007 | Walker et al. | |
| 2008/0004973 A1 | 1/2008 | Rothschild | |
| 2008/0029541 A1 | 2/2008 | Wallace et al. | |
| 2008/0051193 A1 | 2/2008 | Kaminkow et al. | |
| 2008/0116262 A1 | 5/2008 | Majer | |
| 2008/0173705 A1 | 7/2008 | Girard et al. | |
| 2008/0201241 A1* | 8/2008 | Pecoraro | 705/27 |
| 2009/0065520 A1 | 3/2009 | Peters et al. | |
| 2009/0069930 A1 | 3/2009 | Peters et al. | |
| 2009/0069931 A1 | 3/2009 | Peters et al. | |
| 2009/0069949 A1 | 3/2009 | Carpenter et al. | |
| 2010/0114368 A1 | 5/2010 | Walker et al. | |
| 2010/0116842 A1* | 5/2010 | Hecht et al. | 222/1 |
| 2011/0315711 A1* | 12/2011 | Hecht et al. | 222/129.1 |
| 2012/0037008 A1* | 2/2012 | Rodriguez | 99/289 R |
| 2013/0079926 A1 | 3/2013 | Peters et al. | |

FOREIGN PATENT DOCUMENTS

| | | | |
|---|---|---|---|
| DE | 4013147 | 10/1991 | |
| EP | 1165428 | 7/2003 | |
| EP | 1626375 A1 | 2/2006 | |
| EP | 1637055 | 3/2006 | |
| FR | 2624844 | 6/1989 | |
| FR | 2624844 A | 6/1989 | |
| GB | 2416757 A | 9/2004 | |
| JP | S59-055597 | 3/1984 | |
| JP | S61-288289 | 12/1986 | |
| JP | H05-089329 | 4/1993 | |
| JP | H05-094577 | 4/1993 | |
| JP | H05-128349 | 5/1993 | |
| JP | 11262649 | 9/1999 | |
| JP | 2000099822 | 4/2000 | |
| JP | 2001250161 | 9/2001 | |
| JP | 2001-319026 | 11/2001 | |
| JP | 2002099950 | 4/2002 | |
| JP | 2002245536 | 8/2002 | |
| JP | 2002538561 | 11/2002 | |
| JP | 2003016164 | 1/2003 | |
| JP | 2003506184 | 2/2003 | |
| JP | 2003121505 | 4/2003 | |
| JP | 2003-303372 | 10/2003 | |
| JP | 2003337974 | 11/2003 | |
| JP | 2005276148 | 10/2005 | |
| JP | 2006309336 | 11/2006 | |
| JP | 2009524868 | 7/2009 | |
| RU | 2146102 | 10/2000 | |
| RU | 2297385 | 4/2007 | |
| WO | 9837518 | 8/1998 | |
| WO | 0211087 A1 | 2/2002 | |
| WO | WO 02/083282 A1 * | 10/2002 | B01F 13/10 |
| WO | 2005063091 | 7/2005 | |
| WO | 2005091236 A1 | 9/2005 | |
| WO | 2006101394 A | 9/2005 | |
| WO | 2006101394 A | 9/2006 | |
| WO | 2006101394 A2 | 9/2006 | |
| WO | 2006131431 A1 | 12/2006 | |
| WO | 2007056407 | 5/2007 | |
| WO | 2007070032 A1 | 6/2007 | |
| WO | 2007085925 | 8/2007 | |
| WO | 2007127525 | 11/2007 | |
| WO | 2009032911 A1 | 3/2009 | |
| WO | 2009032938 A2 | 3/2009 | |
| WO | 2009032942 A2 | 3/2009 | |
| WO | 2009032946 A1 | 3/2009 | |

OTHER PUBLICATIONS

Disclosure Under 37 C.F.R. §1.56 as filed Dec. 22, 2008.
Invitation to Pay Additional Fees and Partial International Search for PCT/US2008/075281 dated Mar. 13, 2009.
International Search Report and Written Opinion for PCT/US2008/075235 dated Feb. 4, 2009.
International Search Report and Written Opinion for PCT/US2008/075287 dated Feb. 18, 2009.
International Search Report and Written Opinion for PCT/US2008/075272 dated Apr. 6, 2009.
International Search Report and Written Opinion for PCT/US2008/075277 dated Apr. 24, 2009.
International Search Report and Written Opinion for PCT/US2009/035410 dated Apr. 14, 2009.
International Search Report and Written Opinion for PCT/US2009/035414 dated Mar. 23, 2009.
International Search Report and Written Opinion for PCT/US2009/035407 dated Apr. 28, 2009.
Disclosure Under 37 C.F.R. 1.56 as filed Jul. 18, 2011.

* cited by examiner

800

900

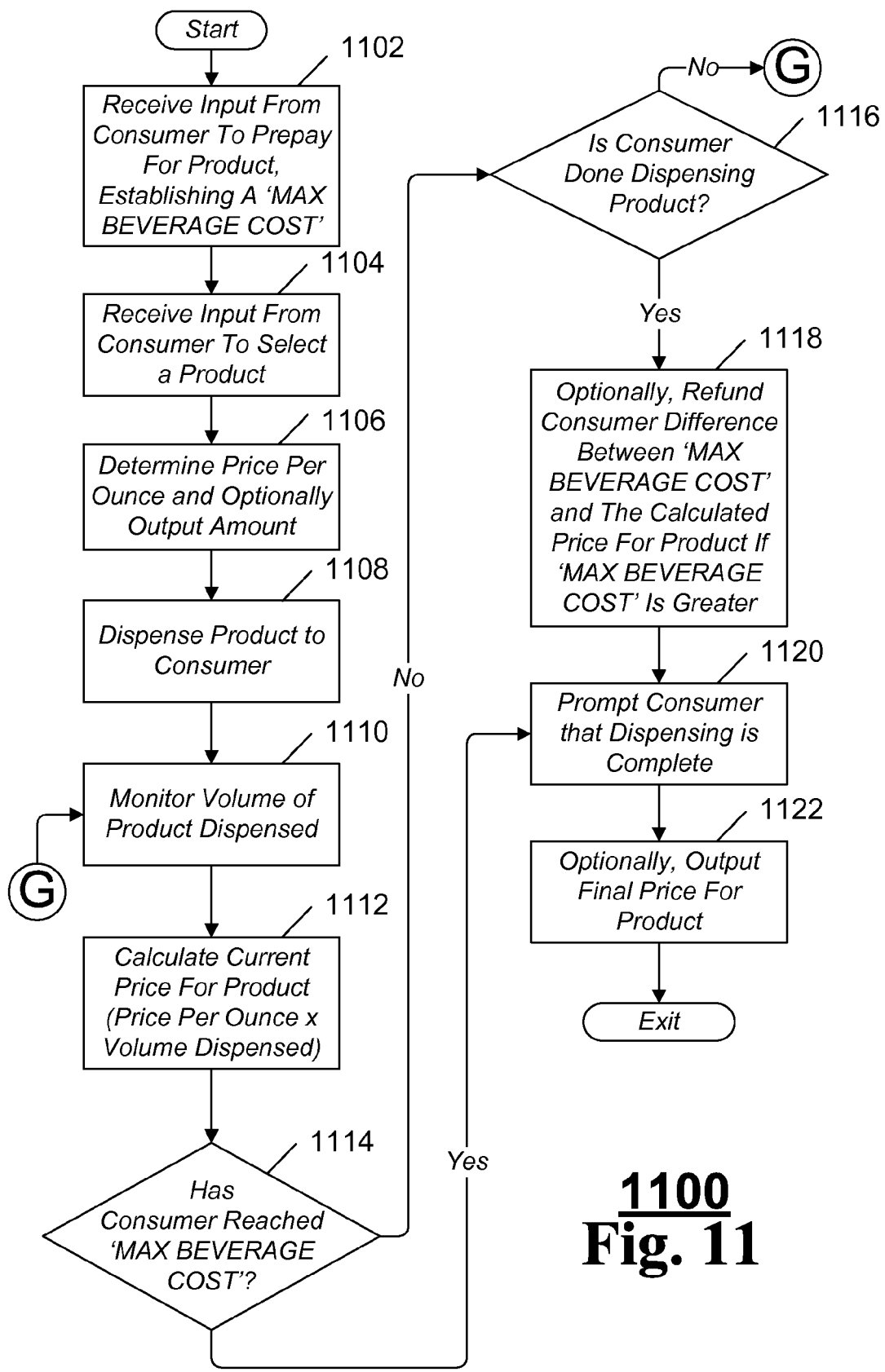

SYSTEMS AND METHODS FOR FACILITATING CONSUMER-DISPENSER INTERACTIONS

RELATED APPLICATIONS

This application claims priority to U.S. Provisional Ser. No. 60/970,513, entitled "Systems and Methods for Facilitating Consumer-Dispenser Interactions," filed on Sep. 6, 2007; and U.S. Provisional Ser. No. 60/970,511, entitled "Systems and Methods for Facilitating Consumer-Dispenser Interactions," filed on Sep. 6, 2007, the contents of which are incorporated by reference.

TRADEMARKS

COCA-COLA® is a registered trademark of The Coca-Cola Company, Atlanta, Ga., U.S.A. Other names, symbols, designs, or logos used herein may be registered trademarks, trademarks or product names of The Coca-Cola Company or other companies.

TECHNICAL FIELD

This invention relates to product dispensers, and in particular, relates to systems and methods for consumer-dispenser interactions.

BACKGROUND OF THE INVENTION

Conventional beverage dispensers can pour a beverage by combining a syrup, sweetener, and/or water. To create a finite variety of beverage selections different kinds of syrup can be offered. This typically results in being able to offer a finite number of branded and non-branded beverage selections. As an example, a single prior art dispenser using several different kinds of syrup might be able to offer limited choices of COCA-COLA™, DIET COCA-COLA™, SPRITE™, and a few other branded or non-branded beverage selections.

One problem with these types of conventional beverage dispensers is that only a limited number of drinks can be offered. As such, conventional beverage dispensers may be limited in being able to offer the consumer what they want. In this regard, consumers want a wider menu of beverage selections and the ability to customize their beverage. Research suggests that they want more beverage variations even for a traditional branded beverage. For example, offering COCA-COLA™, COCA-COLA™ with lime, CHERRY COCA-COLA™, VANILLA COCA-COLA™ and numerous other types of COCA-COLA™ beverage variations. Offering all the variations possible for a single drink brand such as COCA-COLA™ is impractical in conventional beverage dispensers in part because conventional beverage dispensers have limited capacity and selection capability. They may not offer the consumer what the consumer wants, that is, a complete variety of choices for all types of branded and non-branded beverages.

SUMMARY OF THE INVENTION

Some or all of the above needs and/or problems may be addressed by embodiments of the invention. Certain embodiments of the invention can include systems and methods for facilitating consumer-dispenser interactions. In one embodiment, a product dispenser is provided. The product dispenser can include a user interface operable to interact with a consumer and receive at least one input from the consumer. The product dispenser can also include a controller comprising a set of instructions operable to receive a request from a consumer to dispense a custom product. In addition, the controller can further comprise a set of instructions to present via the user interface a at least one of a list of selectable product ingredients or adjustable product formulation parameters. Moreover, the controller can further comprise a set of instructions to dispense a product based at least in part on one or more of the selectable ingredients or selected formulation parameters.

In another embodiment, a method for operating a product dispenser is provided. The method can include receiving a request from a consumer to dispense a custom product. Furthermore, the method can include presenting at least one of a list of selectable product ingredients or adjustable product formulation parameters based at least in part on the information associated with the consumer. In addition, the method can include receiving input regarding at least one of selectable product ingredients or product formulation parameters. Moreover, the method can include dispensing a product based at least in part on one or more of the selectable product ingredients or product formulation parameters.

In yet another embodiment, a method for operating a product dispenser can be provided. The method can include receiving information associated with the consumer. In addition, the method can include presenting via a user interface associated with the product dispenser at least one product recipe comprising at least one selectable product ingredient or adjustable product formulation parameter based at least in part on the information associated with the consumer. Furthermore, the method can include receiving a consumer input regarding at least one of selectable product ingredients or product formulation parameters. The method can also include dispensing a product based at least in part on one or more of the selected product ingredients or product formulation parameters.

In another embodiment, a product dispenser can include a user interface operable to interact with a consumer and receive at least one input from the consumer. In addition, the product dispenser can include a controller comprising a set of instructions operable to receive information associated with the consumer. In addition, the controller can further comprise a set of instructions operable to present via the user interface associated with the product dispenser at least one product recipe comprising at least one selectable product ingredient or adjustable product formulation parameter based at least in part on the information associated with the consumer. Furthermore, the controller can further comprise a set of instructions operable to receive a consumer input regarding at least one of selectable product ingredients or product formulation parameters. Moreover, the controller can further comprise a set of instructions operable to dispense a product based at least in part on one or more of the selected product ingredients or product formulation parameters.

In yet another embodiment, a system can be provided. The system can include a communication network, and a plurality of product dispensers in communication with the network. Each product dispenser can include a user interface operable to interact with a consumer and receive at least one input from the consumer. In addition, each product dispenser can include a controller comprising a set of instructions operable to receive via the network information associated with the consumer. In addition, the controller can further comprise a set of instructions operable to present via the user interface associated with the product dispenser at least one product recipe comprising at least one selectable product ingredient or adjustable product formulation parameter based at least in part on the information associated with the consumer. Moreover, the controller can further comprise a set of instructions operable to receive a consumer input regarding at least one of selectable product ingredients or product formulation parameters. The controller can further comprise a set of instructions operable to dispense a product based at least in part on one or more of the selected product ingredients or product formulation parameters.

Additional systems, methods, dispensers, features and aspects are realized through the techniques of various embodiments of the invention. Other embodiments and aspects of the invention are described in detail herein and are considered a part of the claimed invention. Other aspects and features can be understood with reference to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and aspects of the invention are apparent from the following detailed description taken in conjunction with the accompanying drawings in which:

FIG. 11 illustrates one example method of charging for a product based on the volume of product dispensed and paying for the product by way of prepayment in accordance with an embodiment of the invention.

The detailed description explains various embodiments of the invention, together with aspects and features, by way of example with reference to the drawings.

DETAILED DESCRIPTION OF EMBODIMENTS OF THE INVENTION

As used herein, the terms "beverage forming dispenser", "product dispenser", "beverage dispenser", "dispenser apparatus", and "dispenser" refer to a device which dispenses a product such as a beverage, can, bottle, or container.

As used herein, the terms "product" and "beverage", and their pluralized forms, are used synonymously, and embodiments of the invention should not be limited in scope by the use of either term.

Figure 1:
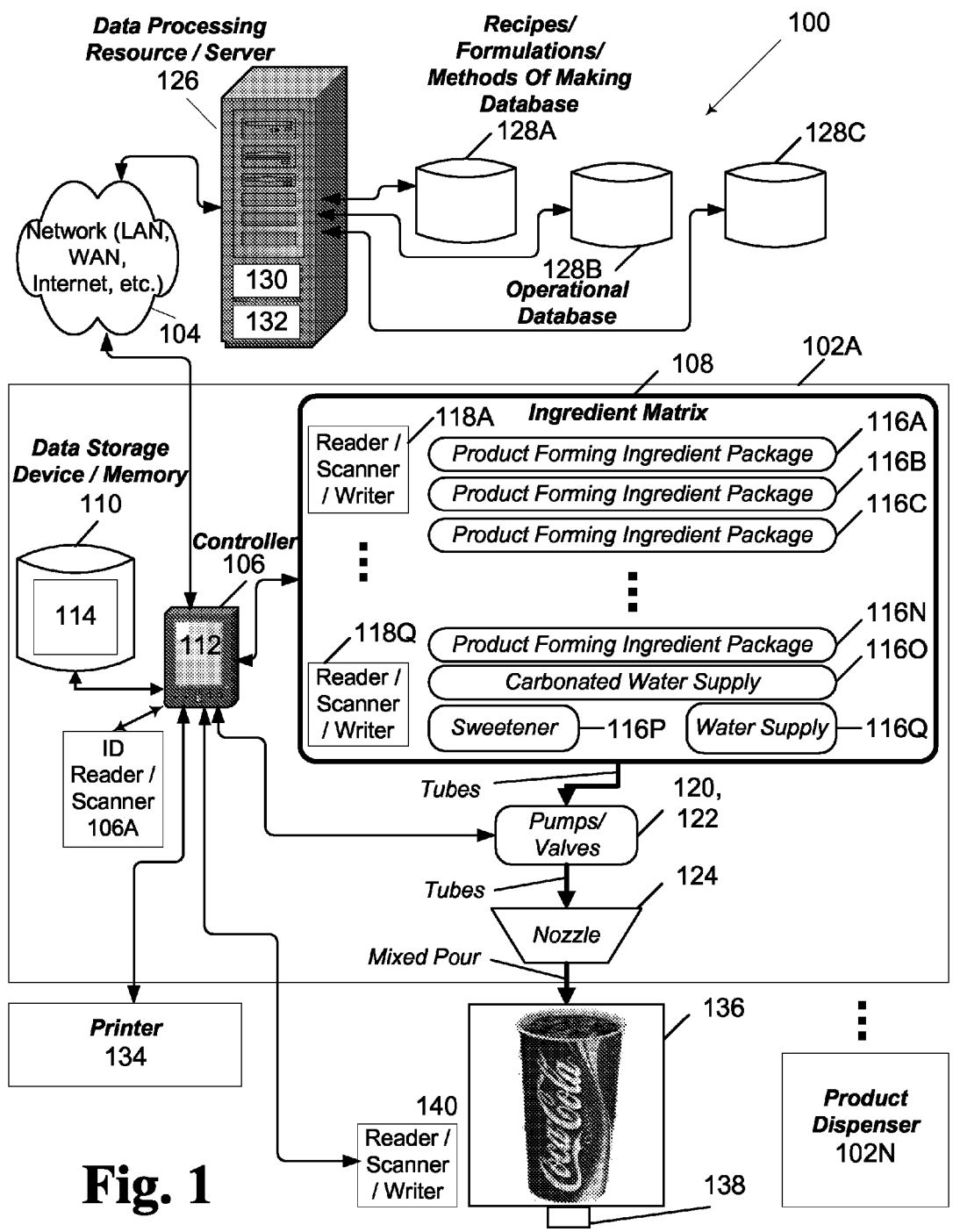
FIG. 1 illustrates an example system including a product dispenser and associated network in accordance with an embodiment of the invention.

Turning now to the drawings in greater detail, an example system 100 for a product dispenser according to an embodiment of the invention is shown in FIG. 1. The example system, such as 100, can operate with a networked computer environment which includes at least one network in communication with a product dispenser. For example in FIG. 1, a product dispenser 102A is shown in communications with a communications network 104. In this embodiment, at least one of the product dispensers, such as 102A, can interface with a consumer, customer, or other user. Other example environments or systems for a product dispenser according to an embodiment of the invention may include non-network configurations.

The example product dispenser, such as 102A shown in FIG. 1, can be a client-type device. Each product dispenser 102A-102N can be a computer or processor-based device capable of communicating with the communications network 104 via a signal, such as a wireless frequency signal or a direct wired communication signal.

Each product dispenser, such as 102A, can include a processor or controller 106, an identification reader/scanner device 106A, an ingredient matrix 108, a computer-readable medium, such as a random access memory (RAM) 110, coupled to the processor or controller 106, and an input/output device, such as display device 112. The processor or controller, such as 106, can execute computer-executable program instructions stored in memory, such as 110. Computer executable program instructions stored in memory, such as 110, can include any number of module application programs, such as a consumer interaction engine or module, such as 114. The consumer interaction engine or module, such as 114, can be adapted to implement various methods for consumer-dispenser interaction. In addition, a consumer interaction engine or module, such as 114, can be adapted to receive one or more signals from one or more consumers, remote and/or local servers or data processing resources, and client-type devices or wireless communication devices. Other examples of functionality and aspects of embodiments of a consumer interaction engine or module, such as 114, are described below.

The identification reader/scanner device 106A shown in FIG. 1 can be in communication with the controller 106, and can receive or otherwise obtain identification information from any number of devices or means associated with a consumer. For example, an identification reader/scanner device, such as 106A, can include a machine readable code technology such as bar code, or may include any wireless communication technology such as RFID, reflected light frequency, optical, etc.

As shown in FIG. 1, the processor or controller, such as 106, can be in communication with an ingredient matrix, such as 108, to control, monitor, and track the addition, flow, and removal of some or all of the ingredients to or from the matrix, such as 108. An ingredient matrix can be, for example, a series of receptacles or mountings capable of receiving or mounting to a respective product ingredient package or other product ingredient supply. For example, a product ingredient package, such as 116A, can be manufactured as a pouch of liquid secured in a plastic ridged container to allow insertion into an ingredient matrix, such as 108. When inserted into the ingredient matrix, such as 108, the package, such as 116A, or pouch can be pierced by at least one associated fitting which allows the liquid in the package, such as 116A, or pouch to be pumped or otherwise metered by the controller, such as 106, or the matrix, such as 108 and associated equipment in precise ratios to form the desired product, such as a beverage. In one embodiment, one or more product ingredient packages, such as 116A-116Q, can be inserted into an ingredient matrix, such as 108. The ingredient matrix, such as 108, in this embodiment can secure some or all of the product ingredient packages, such as 116A-116Q. In one embodiment, one or more product packages, such as 116O, 116P, 116Q may be direct supplies rather than packages. For example, a product package, such as 116O, can be a continuous supply of carbonated water provided from a carbonated water source; a product package, such as 116P, can be a sweetener provided from a sweetener source such as a non-nutritive sweetener (NNS) or high fructose corn syrup (HFCS); and a product package, such as 116Q, can be a continuous supply of water from a tap, purified, or distilled water source. In any embodiment, ingredients, components, or product additives may be in the form of a pouch, or may be in another configuration suitable for access by the ingredient matrix, such as 108.

In the embodiment shown in FIG. 1, a product dispenser, such as 102A, with an ingredient matrix, such as 108, can include one or more machine readable code readers, such as 118A-118Q, utilizing a machine readable code technology such as bar code, RFID, reflected light frequency, optical, etc. In one embodiment, at least one machine readable code reader, such as 118A-118Q, can be associated with a location associated with an ingredient matrix, such as 108, wherein some or all of the product ingredient packages, such as 116A-116Q, can be scanned, read, or otherwise identified prior to insertion into or connection with the ingredient matrix, such as 108. In this regard, the processor or controller, such as 106, can receive or obtain information related to some or all of the product ingredient packages, such as 116A-116Q, and use such information to identify within the ingredient matrix, such as 108, an optimum or other desired location within the ingredient matrix, such as 108, for placement of the product ingredient package, such as 116A. For example, data from a product ingredient package, such as 116A, can be read, scan, or identified from a serial number or identification code associated with the product ingredient package, such as 116A. Such data can be utilized alone or correlated with previously stored information in at least one database, such as 128A-128C, described below, or with data otherwise accessible or stored by a data processing resource or server, described below, such as 126, which may identify one or more ingredients associated with the product ingredient package, such as 116A. In another example, data from a product ingredient package, such as 116A, can be a ingredient code or identifier, and can be utilized alone or correlated with previously stored information in a database, such as 128A-128C, or with data otherwise accessible or stored by a data processing resource or server, such as 126, which may identify one or more ingredients associated with the product ingredient package, such as 116A.

In the embodiment shown in FIG. 1, a product dispenser, such as 102A, with an ingredient matrix, such as 108, can include one or more pumps and/or valves, such as 120 and 122 respectively, and a nozzle, such as 124. In this example, each of the pumps, such as 120, and valves, such as 122, can be controlled by the product dispenser, such as 102A. For instance, the processor or controller, such as 106, can be in communication with some or all of the pumps, such as 120, and valves, such as 122. In this regard, some or all of the pumps, such as 120, and/or valves, such as 122, can be selectively operated by the processor or controller, such as 106, to pump, meter, or otherwise obtain respective product products or ingredients from certain of the product ingredient packages, such as 116A-116Q, to dispense a custom product or beverage.

In one embodiment, an ingredient matrix, such as 108, can have multiple product ingredient packages, such as 116A-116Q, inserted into it, wherein each package may contain a different or unique ingredient. By way of one or more commands or instructions from a processor or controller, such as 106, to one or more pumps, such as 120 and/or valves, such as 122, associated with the ingredient matrix, such as 108, varying ratios of ingredients from some or all of the product ingredient packages, such as 116A-116Q, can be selectively combined to form various types of products, such as beverages. Example ingredients can include, but are not limited to, a flavoring, a concentrate, a syrup, a sweetener, water, carbonated water, a lime flavoring, vanilla flavoring, cherry flavoring, and any ingredient part of a branded or non-branded drink, such as CHERRY COCA-COLA™, VANILLA COCA-COLA™, COCA-COLA™, DIET COCA-COLA™, and FANTA™.

In one embodiment, one or more of the product ingredient packages, such as 116A-116Q, may contain ingredients referred to as "pungent", which may limit their placement within an ingredient matrix, such as 108. Pungent-type ingredients can be relatively strong such that once a pungent ingredient is pumped or otherwise drawn through a particular portion of a product dispenser, such as 102A, any associated path through the dispenser, such as 102A, such as tubing in the product dispenser, such as 102A, may be permanently flavored and any subsequent ingredient or fluid that is pumped or drawn through the path or tubing may be tainted with the taste of the pungent-type ingredient. As such, once a pungent-type ingredient is used in an ingredient matrix, such as 108, an associated processor or controller, such as 106, can track or otherwise store information that controls or limits the replacement and/or addition of other pungent ingredients to certain locations of the ingredient matrix, such as 108, to avoid mixing pungent-type ingredients or tainting non-pungent ingredients in order to maintain product or beverage quality.

In another embodiment, one or more product ingredient packages, such as 116A-116Q, may require agitation to keep the associated ingredient sufficiently mixed. In such instances, the location of such ingredients in an ingredient matrix, such as 108, can be limited to locations within the ingredient matrix, such as 108, that can be agitated as may be required and/or desired in a particular embodiment.

In another embodiment, ingredients from one or more of product ingredient packages, such as 116A-116Q, may be dispensed through antimicrobial-type tubing and/or dispenser parts. Such ingredients can include, but are not limited to, milk, dairy, soy, and/or other types and kinds of product ingredient packages. In these instances, the location of such ingredients in an ingredient matrix, such as 108, can be limited to locations within the ingredient matrix, such as 108, that utilize suitable antimicrobial-type tubing and/or dispenser parts as may be required and/or desired in a particular embodiment.

In yet another embodiment, a one-to-one relationship can be established between a particular product ingredient package, such as 116A, and at least one pump and/or valve, such as 120 and/or 122 respectively. In some instances, utilizing more than one pump and/or valve for a single product ingredient package, such as 116A, can draw a relatively higher volume of an ingredient from the package, such as 116A, in a relatively shorter period of time. For example, a product ingredient package containing a sweetener, such as sweetener, such as 116P, may utilize more than one pump and/or valve to draw a relatively higher volume of an ingredient from the package 116P in a relatively shorter period of time.

Returning to FIG. 1, any number of other product dispensers, such as 102A-102N, can also be in communication with the network, such as 104. In one embodiment, the communications network, such as 104, shown in FIG. 1 can be a local area network (LAN). In another embodiment, a communications network can be a wireless communications network capable of transmitting both voice and data signals, including image data signals or multimedia signals. Other networks can include, but are not limited to, Internet, a local area network (LAN), a wide area network (WAN), a LON WORKS network, a wired network, a wireless network, or any combination thereof.

The network, such as 104 of FIG. 1, is also shown in communication with at least one data processing resource, such as a server 126, and at least one database, such as 128A. In this embodiment, a server such as 126, can be a processor-based device capable of communicating with some or all of the product dispensers, such as 102A-102N via the communications network, such as 104, by way of a signal, such as a wireless frequency signal or a direct wired communication signal. In addition, a data processing resource or server, such as 126, can be used to aid or facilitate recipes, formulations, methods of making products or beverages, provide operational data processing, perform data processing related to consumer interaction, and/or perform other data processing as may be required and or desired in a particular embodiment. Such operational data processing can include, for example and not as a limitation, equipment status, maintenance, service alerts, predictive restock, and/or other types and kinds or operational data processing as may be required and/or desired in a particular embodiment. Such consumer interaction support can include, for example and not as a limitation, consumer preferences, consumer product or product or beverage preferences, loyalty, gaming, prizes, media content, customizations, and/or other types and kinds of consumer interaction and/or data processing support as may be required and/or desired by a particular embodiment.

The server, such as 126 in FIG. 1, can include a processor, such as 130, and a computer-readable medium, such as a random access memory (RAM) 132, coupled to the processor 130. The processor, such as 130, can execute computer-executable program instructions stored in memory, such as 132. Computer executable program instructions stored in memory, such as 132, can include any number of module application programs, such as a consumer interaction engine or module similar to 114. The consumer interaction engine or module similar to 114 can be adapted to implement various methods for consumer-interaction. In addition, a consumer interaction engine or module similar to 114 can be adapted to interact with one or more consumers, and one or more servers or data processing resources. Other examples of functionality and aspects of embodiments of a consumer interaction engine or module similar to 114 are described below.

Through the network, such as 104 in FIG. 1, some or all of the product dispensers, such as 102A-102N, can retrieve, receive, or otherwise access information stored in some or all of the databases, such as a recipes, formulations, and methods of making products or beverages database, such as 128A, operational database, such as 128B, and consumer database, such as 128C. In any instance, one or more of the databases can include product or beverage formation information such as one or more product or beverage recipes, formulations, and methods of making products or beverages. Such product or beverage recipes, formulations, and methods of making products or beverages can include an ingredient list, the ratio of each ingredient, a listing of how a product or beverage can be customized by a consumer, and/or other types and kinds of product or beverage recipes, formulations, and methods of making a product or beverage as may be required and/or desired by a particular embodiment.

In one embodiment, a product dispenser, such as 102A, can be configured to print a coupon or other document. In the embodiment shown, an associated printer or other output device, such as 134, can be in communication with the product dispenser, such as 102A. In other embodiments, a printer or other output device can be in communication with a product dispenser, such as 102A, via a network, such as 104.

The example environment or system, such as 100 shown in FIG. 1, can facilitate customer, consumer, and user interaction with a product dispenser and network. For example and not as a limitation, a user such as a consumer can make a product or beverage type selection at a product dispenser, such as 102A, by way of an input/output device, such as display device 112. An associated processor or controller, such as 106, can facilitate a user's selection via display device, such as 112, of a particular recipe to form a selected product or beverage. The processor or controller, such as 106, can display one or more products or beverages for selection via the display device, such as 112. The user may select at least one of the products or beverages using the display device, such as 112, for instance, pressing a button provided by or associated with the display device 112. The processor or controller, such as 106, may obtain from a local memory, such as 110, or may communicate via a network, such as 104, with at least one database, or may communicate with at least one data processing resource, such as server 126, to obtain corresponding ingredients and/or ratio of ingredients for forming the selected product or beverage. The processor or controller, such as 106, can utilize the information to operate one or more pumps, such as 120, and/or valves, such as 122, to form and dispense a product or beverage by way of a nozzle, such as 124, into a cup or other container, such as 136.

In another example, a user such as a customer or package installation personnel can facilitate scanning or reading one or more product ingredient packages, such as 116A-116Q, when the packages 116A-16Q are inserted within an ingredient matrix, such as 108, associated with a product dispenser, such as 102A. A processor or controller, such as 106, associated with the product dispenser, such as 102A, can identify an optimum or selected location within the ingredient matrix, such as 108. The user, customer, or package installation personnel can be informed where a particular product ingredient package, such as 116A, is to be located in the ingredient matrix, such as 108, by way of an input/output device, such as display device, such as 112. An example of a display device can include, but is not limited to, a light emitting diode (LED) display indicator, LCD screen, input/output (I/O) interface, audio interface or other types and kinds of displays or indicators as may be required and/or desired in a particular embodiment.

In one embodiment, insertion of a particular product ingredient package, such as 116A, within an ingredient matrix, such as 108, can be checked or otherwise verified by scanning a machine readable code on the respective package, such as 116A, and scanning a machine readable code located on the ingredient matrix, such as 108, at the point of insertion (illustrated as 118A). In this regard, an associated processor or controller, such as 106, can check or verify that the product ingredient package, such as 116A, is correctly located within the ingredient matrix, such as 108.

In another embodiment, a cup, such as 136, or other container can include identification information, such as a RFID or other machine readable tag, such as 138, mounted to the cup as shown in FIG. 1. In some embodiments, identification information can be associated with a consumer by way of, for instance, RFID or other machine readable tag, similar to 138, embodied in or otherwise mounted to an icon or other object. A reader, such as a RFID or other machine readable code reader, such as 140, associated with a product dispenser, such as 102A, can receive or otherwise obtain the identification information from the RFID or other machine readable tag, similar to 138. As shown in FIG. 1, a processor or controller, such as 106, associated with the product dispenser, such as 102A, can be in communication with the RFID or other machine readable code reader, such as 140, and some or all identification information obtained from the RFID or other machine readable tag, such as 138, can be stored or otherwise processed by the processor or controller, such as 106. In this embodiment, the identification information can be embodied in a machine readable code, a bar code, RFID, radio frequency, infrared, or other wireless communication methods or devices, or other types and kinds of coding and/or storage technologies as may be required and/or desired in a particular embodiment. The RFID reader or machine readable code reader, such as 140, can be a corresponding device to read or receive the identification information from the RFID or other machine readable tag, such as 138, and can include a RFID read/write device, an infrared device, a magnetic card reader, a bar code reader, or other suitable reader or receiver technologies as may be required and/or desired in a particular embodiment.

In yet another embodiment, a server or transaction processing resource, such as 142, can facilitate a payment or payment processing when a consumer selects and attempts to pay for a product, such as a beverage, at a product dispenser, such as 102A. An associated processor or controller, such as 106, can receive the consumer's payment or related information by way of, for instance, a display device, such as 112, data transmission, or other input, before, during, or after the selection of the particular product or beverage. In any instance, the processor or controller, such as 106, can transmit the payment or related information to the server or transaction processing resource, such as 142, via a network, such as 104. The server or transaction processing resource, such as 142, may access least one database, such as 128A-128C, or may communicate with at least one data processing resource, such as 126, to authorize or otherwise validate a payment or related information prior to accepting a payment from the consumer or otherwise dispensing the selected product or beverage to the consumer.

Figure 2:
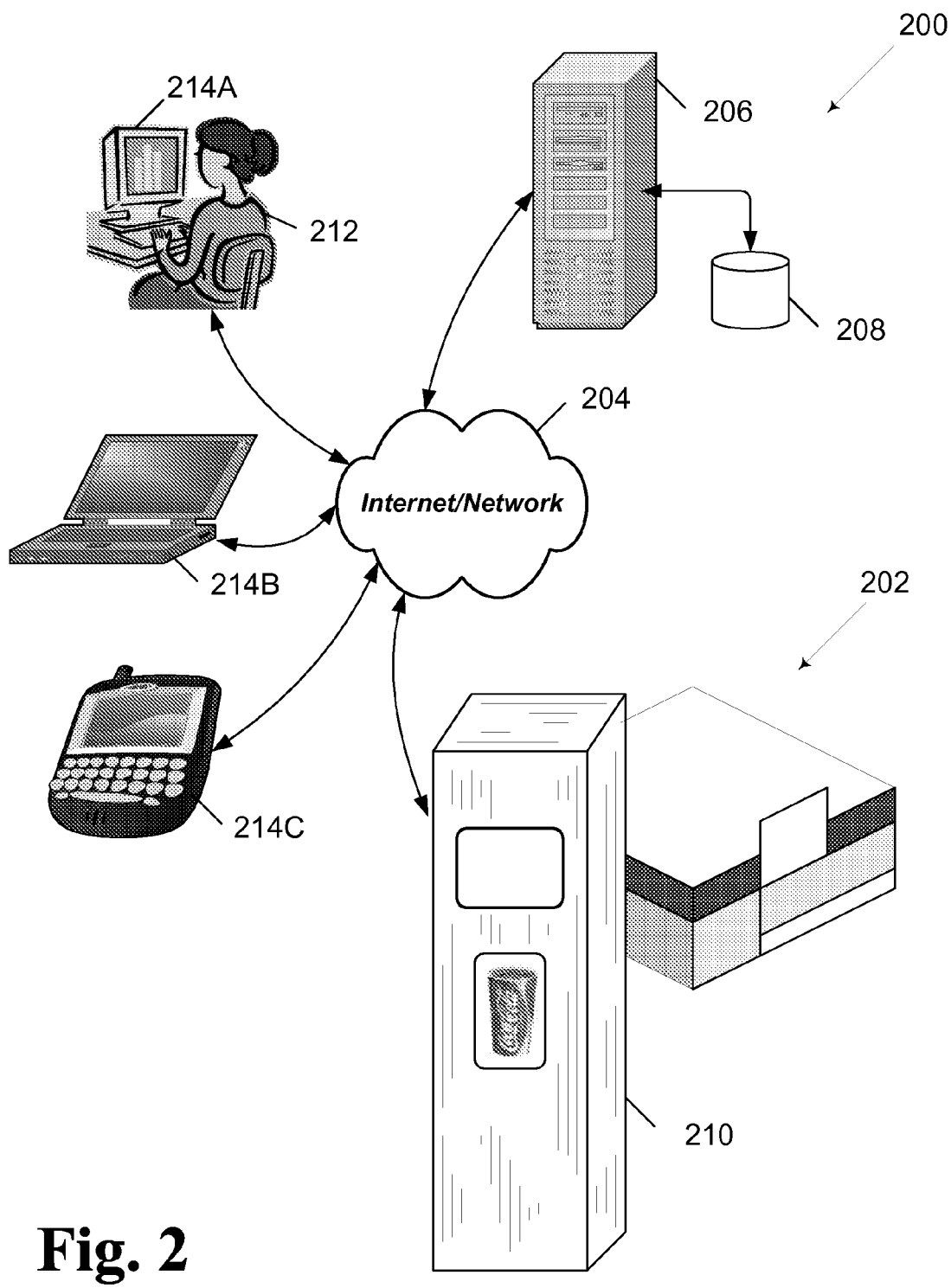
FIG. 2 illustrates one example of a consumer refreshment network in accordance with an embodiment of the invention.

Referring to FIG. 2, an example consumer refreshment environment or system 200 is illustrated. In one embodiment, one or more networked product dispensers, such as 210, can be installed in a plurality of respective locations, such as location 202, and can be in communication via a network 204, such as the Internet or a global network, with one or more servers or data processing resources, such as 206, and one or more data storage devices such as database 208. By way of example, a product dispenser 210 can be similar to a beverage dispenser or dispenser apparatus, described as 102A in FIG. 1. In one example, a product dispenser, such as 210, can include some or all of the following components as described with respect to FIG. 1: an ingredient matrix, such as 108, with locations operable to receive one or more product ingredient packages, such as 116A-116Q, a controller, such as 106, one or more package insertion detection devices or RFID reader/writer, such as 118A-118Q, pumps, such as 120, valves, such as 122, and a nozzle, such as 124. By way of further example, servers or data processing resources 206 can be similar to server or data processing resource described as 126 in FIG. 1.

In one embodiment, one or more consumers, such as 212, can access a network, such as 104, or a consumer refreshment network, such as 204. Through the network 204, a consumer, such as 212, can sign up, configure consumer preferences, access respective accounts, receive promotions, manage loyalty accounts, and/or sign up for other types and kinds of opportunities and services as may be required and or desired in a particular embodiment. In another embodiment, a consumer, such as 212, can choose to access a network 104, or consumer refreshment network system, such as 200, and one or more networked product dispensers, such as 210, by way of any number of client-type devices, including, but not limited to, a personal computer (PC), such as 214A, a data processing device, such as 214B, a wireless communication device, such as 214C, and/or by way of other types and kinds of data processing, processor-based, or client-type devices. An example of a wireless communication device can include, but is not limited to, a wireless data processing device, a wireless phone, a mobile phone, an IPHONE™, an IPOD™, personal data assistant, and/or POCKET PC™M.

Figure 3:
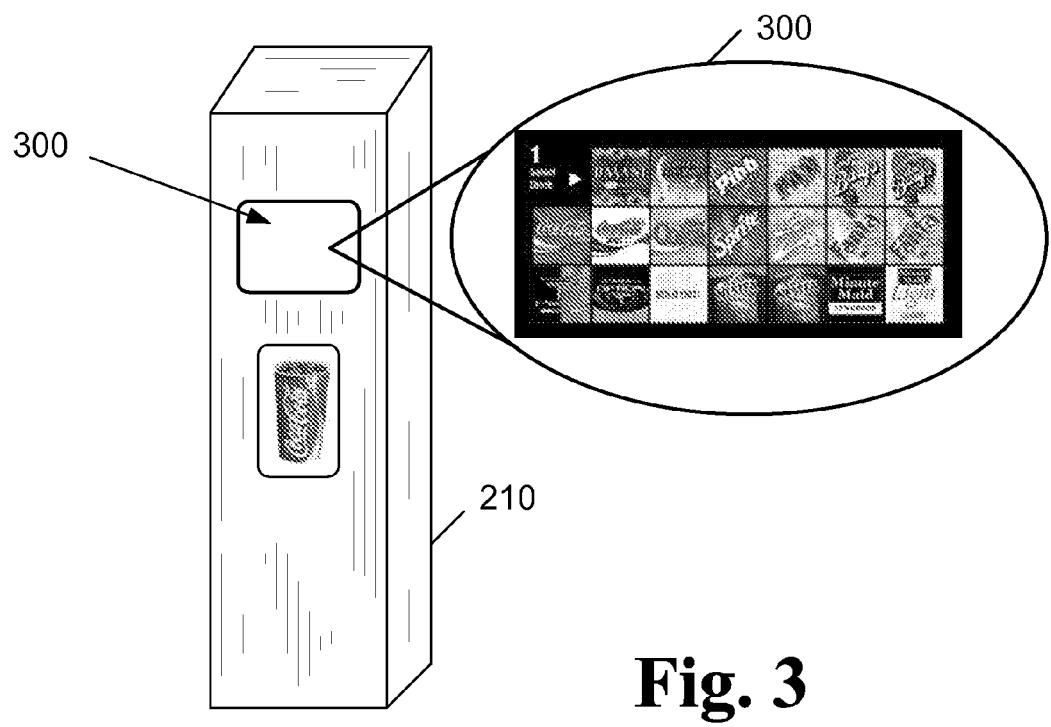
FIG. 3 illustrates one example of an enhanced view graphical user interface in accordance with an embodiment of the invention.

Referring to FIG. 3, an example of an enhanced view graphical user interface 300 is illustrated. In one embodiment shown, a product dispenser, such as 210 in FIG. 2, can include at least one user interface such as an enhanced view graphical user interface, such as 300, or a consumer interface. The user interface, such as 300, and can be used, for instance, by a consumer, such as 212, to select any number of different product or beverage types, kinds, and formulations. In use, a product dispenser, such as 210, with an enhanced view graphical user interface, such as 300, can provide a consumer with selectable product or beverage options in a series of dynamically generated menus, wherein the consumer can locate and select a specific brand, kind, type, and/or formulation of a desired corresponding product or beverage. Once a particular product or beverage option is selected, the consumer can cause a corresponding product or beverage to be formulated and dispensed by the product dispenser.

Figure 4:
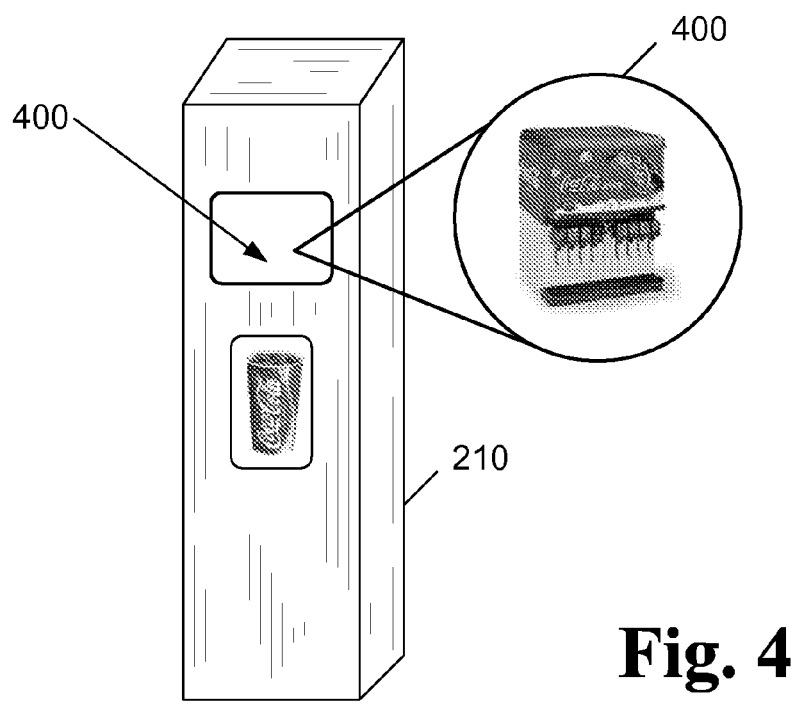
FIG. 4 illustrates one example of a classic view graphical user interface in accordance with an embodiment of the invention.

Referring to FIG. 4, another example of a user interface is shown. In one embodiment, a product dispenser, such as 210 in FIG. 2, can include a classic view graphical user interface, such as 400. The user interface, such as 400, can be used by a consumer, such as 212, to select from a limited number of different product or beverage types, kinds, and/or formulations. In use, a consumer, such as 212, can more easily select a product or beverage from a limited number of product or beverage choices. Once a particular product or beverage option is selected, the consumer can cause a corresponding product or beverage to be formulated and dispensed by the product dispenser. In some embodiments, a classic type graphical user interface can also be referred to as a traditional view as it generally resembles a traditional fountain dispensing valve design. As such, a classic type graphical user interface can be referred to as a traditional view graphical user interface.

In one embodiment, a consumer may desire fewer product or beverage choices than displayed by a product dispenser that allows the selection of, for instance, a plurality of different kinds of products or beverages. In such instances, a classic view graphical user interface with relatively fewer, more traditional product or beverage choices, and including one or more traditional-type product or beverage choices, can be displayed to facilitate, sometimes quicker, consumer interaction with the product dispenser.

In another embodiment, a consumer may elect to create consumer preferences which that tailor the types and/or kinds of brands and/or product or beverage formulations displayed in a user interface, such as a classic view graphical user interface, essentially creating a consumer customized classic view graphical user interface. In this particular embodiment, a consumer can create a consumer customized classic view graphical user interface. For example, when a consumer identifies himself or herself to a product dispenser, such as 210, one or more consumer preferences can be retrieved by the dispenser 210. Based at least in part on one or more consumer preferences, the product dispenser 210 can display a default user interface to the consumer, which may be an enhanced view graphical user interface, a classic view graphical user interface, or a consumer customized classic view graphical user interface.

FIGS. 5-11 are example flowcharts for various methods in accordance with embodiments of the invention. Some or all of the illustrated methods can be implemented by a system, network, product dispenser, or any combination of associated components as shown in FIGS. 1-4.

Figure 5:
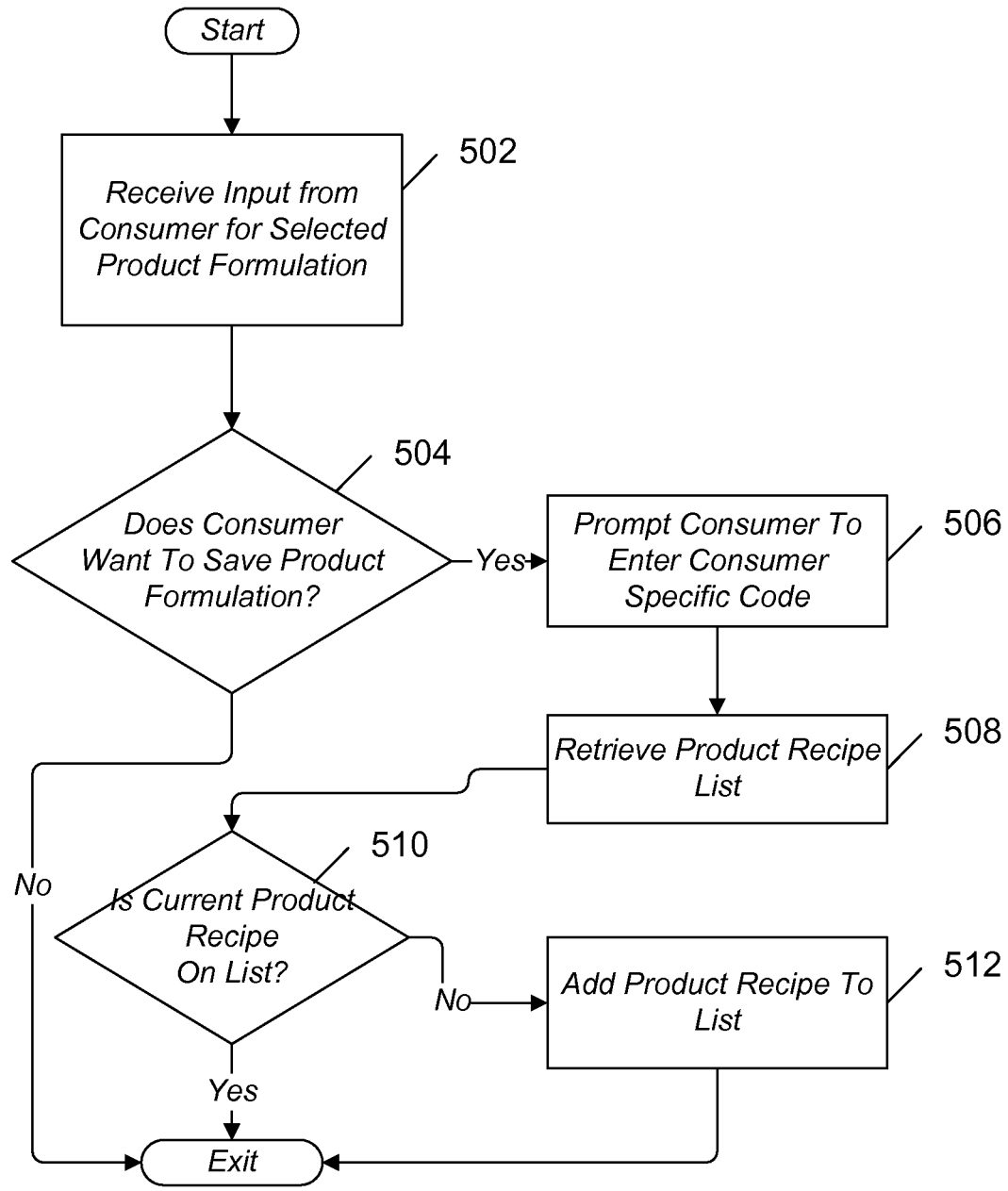
FIG. 5 illustrates one example method of storing a recipe to a recipe list in accordance with an embodiment of the invention.

Referring to FIG. 5, a method 500 for storing a recipe to a recipe list is illustrated. The method 500 begins at block 502, in which an input is received from a consumer to select a product formulation. In the embodiment shown, a consumer can utilize a client-type device, such as 214A-214C in FIG. 2, to gain online access to a website, webpage, or other online location that permits the consumer to select or determine a product formulation to be dispensed from a product dispenser. In another embodiment a consumer can utilize a mobile phone, wireless communication device, or client-type-device, such as 214A-214C in FIG. 2, or other communication device or method to determine a product formulation to be dispensed from a product dispenser. In another embodiment, a consumer can utilize a product dispenser, such as 210 in FIG. 2, to access a user interface, website, webpage, or other offline or online location that permits the consumer to determine a product formulation to be dispensed from a product dispenser. In any instance, the consumer can select or determine a product formulation to be dispensed from a product dispenser.

Block 502 is followed by decision block 504, in which a determination is made as to whether the consumer wants to save the product formulation. If the determination is in the affirmative, that is, a consumer wants to save the product formulation, then the method 500 continues at block 506. If the determination is in the negative, that is, the consumer does not want to save the product formulation, then the method 500 ends. In this embodiment, a processor or controller, such as 106 in FIG. 1, associated with the product dispenser, such as 102A, can determine whether a consumer wants to store or otherwise save a product formulation. Through a user interface associated with the product dispenser, such as user interface 112 in FIG. 1, the consumer can provide an input corresponding to a store or save command. In one embodiment, an input corresponding to a store or save command can be received via a network from a client-type device, such as 214A-214C in FIG. 2, mobile phone, wireless communication device, or other communication device or method associated with the consumer. In these instances, a processor, controller, local and/or remote server or data processing resource, such as 126 in FIG. 1, can receive the store or save command.

Referring to block 506, the consumer is prompted to enter his or her consumer specific code. In the embodiment shown, a consumer can be prompted to utilize a user interface associated with a product dispenser, such as user interface 112 in FIG. 1, to enter a consumer specific code. In response to the prompt by the user interface, such as 112, the consumer can input the consumer specific code via the user interface, such as 112. In one embodiment, a consumer can transmit or otherwise input a consumer specific code via a client-type device, such as 214A-214C in FIG. 2, mobile phone, or wireless communication device, or by way of other communication devices or methods as may be required and/or desired in a particular embodiment.

Block 506 is followed by block 508, in which the consumer's product recipe list is retrieved. In this embodiment, a processor or controller, such as 106 in FIG. 1, associated with the product dispenser, such as 102A, can retrieve a product recipe list in response to receiving the consumer specific code from the consumer. A product recipe list can include, but is not limited to, a list of one or more products associated with the code, a list of one or more products associated with a consumer, or a predefined list of one or more products. In one example, a processor or controller, such as 106, associated with the product dispenser, such as 102A, can retrieve a previously stored product list from an associated memory or other data storage device, such as 110. In another example, a local and/or remote server or data processing resource, such as 126, can generate or otherwise retrieve a product list from an associated memory or data storage device, and provide the product recipe list to a processor or controller, such as 106, associated with the product dispenser, such as 102A. In any instance, a product recipe list can be retrieved.

Block 508 is followed by decision block 510, in which a determination is made as to whether the current product recipe or formulation is on the consumer's product recipe list. If the determination is in the affirmative, that is, the current product recipe or formulation is on the consumer's product recipe list, then the method 500 ends. If the determination is in the negative, that is, the current product formulation is not on the consumer's product recipe list, then the method 500 continues at block 512. In the embodiment shown, a processor or controller, such as 106 in FIG. 1, associated with the product dispenser, such as 102A, can compare the current product formulation to one or more product formulations in a predefined product recipe list associated with the consumer. In another embodiment, a local and/or remote server or data processing resource, such as 126, can compare the current product formulation to one or more product formulations in a predefined product recipe list associated with the consumer. In either instance, based at least in part on the comparison, the processor, controller, local and/or remote server or data processing resource, such as 126, can determine whether the current product formulation is on the consumer's product recipe list.

In block 512, the current product formulation recipe is added to the consumer's product recipe list. In this embodiment, a processor or controller, such as 106 in FIG. 1, associated with the product dispenser, such as 102A, can add or otherwise store the current product formulation recipe in the consumer's product recipe list, and store the new list in an associated memory or other data storage device, such as 110. In another embodiment, a local and/or remote server or data processing resource, such as 126, add or otherwise store the current product formulation recipe in the consumer's product recipe list, and store the new list in an associated memory or data storage device, such as 110. In any instance, the current product formulation recipe is added to the consumer's product recipe list.

The method 500 ends after block 512.

Figure 6:
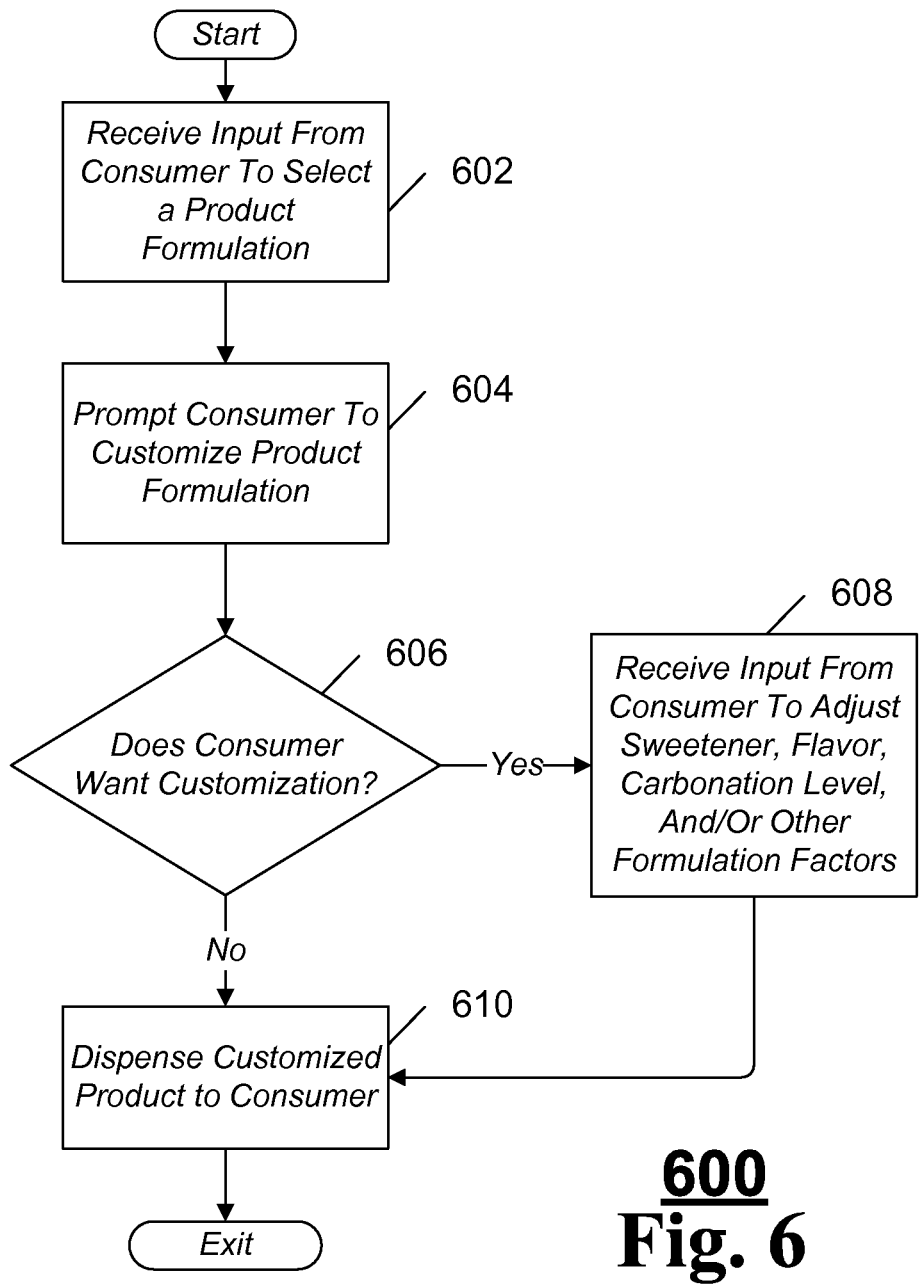
FIG. 6 illustrates one example method of customizing the formulation of a product in accordance with an embodiment of the invention.

Referring to FIG. 6, an example of a method 600 of customizing the formulation of a product is illustrated. The method 600 begins in block 602. In block 602, an input is received from the consumer to select a product formulation. In the embodiment shown, a processor or controller, such as 106 in FIG. 1, associated with the product dispenser, such as 102A, can allow the consumer to select a product formulation associated with a product. For example, after the consumer has had an opportunity to select a suggested product that has been determined for the consumer to try, the consumer may decide or otherwise opt to try a different formulation associated with a product in lieu of the suggested product. The consumer may select the different formulation associated with a product via a user interface associated with the product dispenser, such as user interface 112.

Block 602 is followed by block 604, in which the consumer is prompted whether to customize a product formulation. In the embodiment shown, a processor or controller, such as 106 in FIG. 1, associated with the product dispenser, such as 102A, can generate or otherwise transmit a communication to the consumer that prompts the consumer whether he or she wants to customize a product formulation associated with a product prior to dispensing. For example, the a processor or controller, such as 106, can provide the message and associated prompt to the consumer via an output device, such as a user interface, for instance 112. In another embodiment, a local and/or remote server or data processing resource, such as 126, can generate a communication or other output, such as a message, and transmit the message to the product dispenser, such as 102A, for communication to the consumer. The processor or controller, such as 106, associated with the product dispenser, such as 102A, can receive the message for communication to the consumer. In any instance, the consumer is prompted whether he or she wants to customize a product formulation associated with a product prior to dispensing.

Block 604 is followed by decision block 606, in which a determination is made as to whether the consumer wants to customize the product formulation. If the determination is in the affirmative, that is, the consumer wants to customize the product formulation, then the method 600 continues at block 608. If the determination is in the negative, that is, the consumer does not want to customize the product formulation, then the method 600 continues at block 610. In the embodiment shown, a processor or controller, such as 106 in FIG. 1, associated with the product dispenser, such as 102A, can determine whether the consumer wants to customize the product formulation. For example, the processor or controller, such as 106, can receive a consumer input or selection via a user interface, such as 112, and determine whether the input or selection corresponds to whether the consumer wants to customize the product formulation.

In block 608, an input is received from the consumer to adjust the sweetener level, flavor, carbonation level, and/or other formulation factors of the selected product formulation. In the embodiment shown, a processor or controller, such as 106 in FIG. 1, associated with the product dispenser, such as 102A, can provide options for the consumer to adjust one or more formulation factors associated with a selected product formulation. For example, the processor or controller, such as 106, can provide an option for consumer input or selection via a user interface, such as 112, and determine whether the input or selection corresponds to whether adjusts one or more formulation factors associated with a selected product formulation. Formulation factors can include, but are not limited to, sweetener level, flavor, carbonation level, and/or other formulation factors associated with a product or product formulation.

Block 608 is followed by block 610, in which the customized product is dispensed to the consumer. In the embodiment shown, a processor or controller, such as 106 in FIG. 1, associated with the product dispenser, such as 102A, can allow the consumer to dispense a desired customized product.

The method 600 ends after block 610.

In one embodiment, a consumer can be prompted as to whether he or she wants to customize a product formulation. In this regard, the consumer can adjust the product sweetener level, flavor, carbonation level, and/or adjust other formulation factors of the product he or she has selected.

Figure 7:
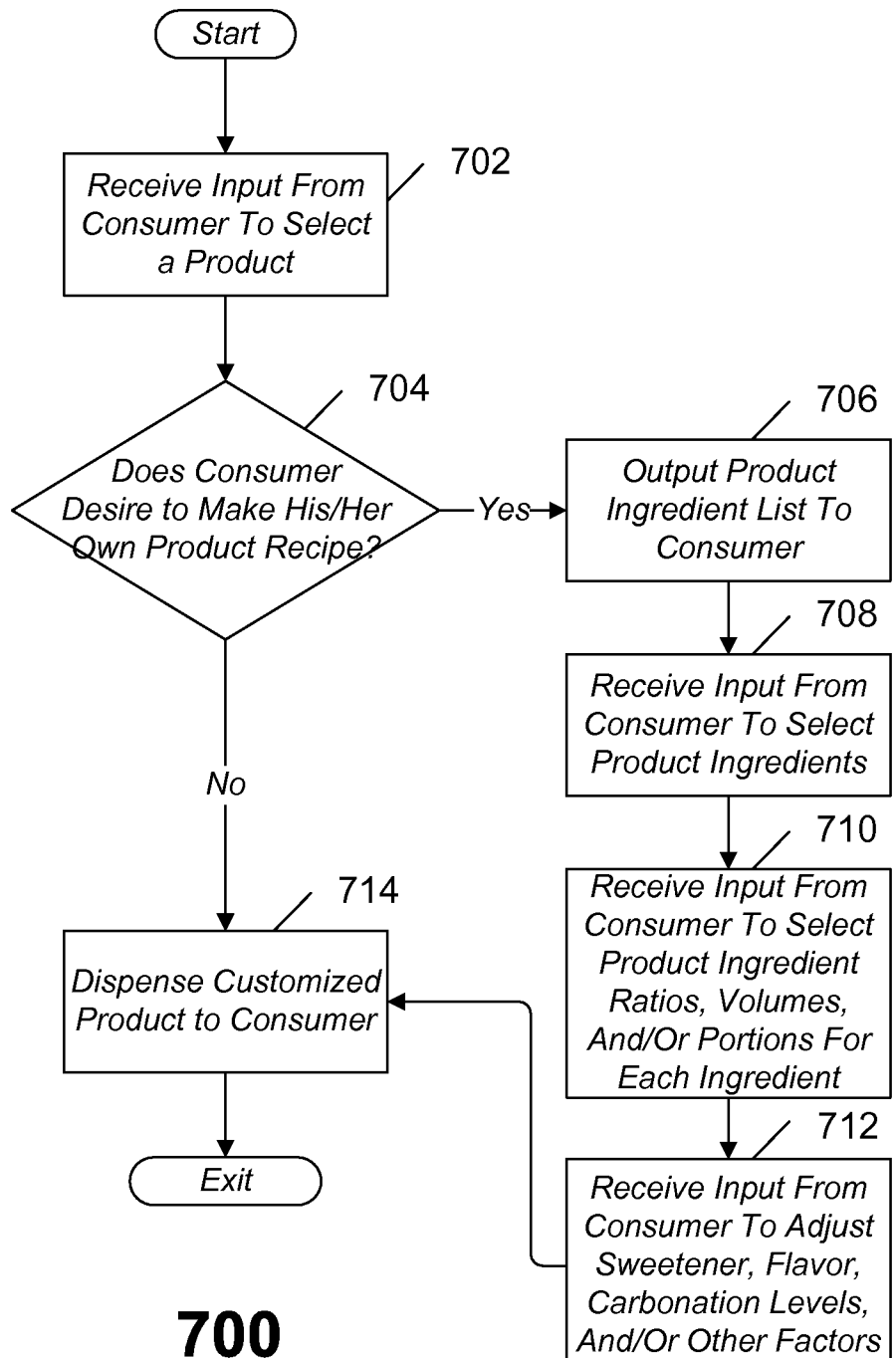
FIG. 7 illustrates one example method of allowing a consumer to make his or her own recipe in accordance with an embodiment of the invention.

Referring to FIG. 7, an example method 700 of allowing a consumer to make his or her own recipe is illustrated. The method 700 begins in block 702. In block 702, an input is received from a consumer to select a product. In the embodiment shown, a processor or controller, such as 106 in FIG. 1, associated with the product dispenser, such as 102A, can allow the consumer to select a product. For example, a product menu or list of product ingredients from which the consumer can make his or her own recipe can be provided by the controller, such as 106, and consumer may decide or otherwise opt to try a product from the product menu or list of product ingredients from which the consumer can make his or her own recipe. The consumer may select the product or various product ingredients via a user interface associated with the product dispenser, such as user interface 112.

Block 702 is followed by decision block 704, in which a determination is made as to whether the consumer selected to make his or her own recipe. If the determination is in the affirmative, that is, the consumer selected to make his or her own recipe, then the method 700 continues at block 706. If the determination is in the negative, that is, the consumer did not select to make his or her own recipe, the method 700 continues at block 714. In this embodiment, a processor or controller associated with a product dispenser, such as controller 106 in FIG. 1, can receive or otherwise obtain information associated with a product selection. Based at least in part on the information associated with a product selection, the processor or controller, such as 106, the product dispenser, such as 102A, can determine whether the consumer selected to make his or her own recipe.

In block 706, an ingredient list is displayed or otherwise output to the consumer on the product dispenser graphical user interface. In the embodiment shown, a processor or controller, such as 106 in FIG. 1, associated with the product dispenser, such as 102A, can provide an ingredient list to the consumer. For example, after the consumer indicates he or she wants to make his or her own recipe, the controller, such as 106, can provide an ingredient list, such as list of product ingredients from which the consumer can make his or her own recipe, via a user interface associated with the product dispenser, such as user interface 112.

Block 706 is followed by block 708, in which an input is received from the consumer to select ingredients from the displayed ingredient list. In the embodiment shown, a processor or controller, such as 106 in FIG. 1, can prompt a consumer to input or otherwise select ingredients from the displayed ingredient list. For example, a consumer can utilize a user interface associated with a product dispenser, such as user interface 112, to provide select ingredients from the displayed ingredient list.

Block 708 is followed by block 710, in which an input is received from the consumer to select ingredient ratios, volumes, and/or portions for each of the ingredients selected. In the embodiment shown, a processor or controller, such as 106 in FIG. 1, can prompt a consumer to input or otherwise select one or more formulation parameters from the displayed ingredient list. For example, a consumer can utilize a user interface associated with a product dispenser, such as user interface 112, to provide select one or more formulation parameters from the displayed ingredient list. Formulation parameters can include, but are not limited to, ingredient ratios, volumes, and/or portions for each of the ingredients selected.

In one embodiment, not only the selection of ingredients but the way in which the ingredients are combined can influence the final product formulation, quality, and/or taste. In this regard, determining the quantities of the ingredients can be selected by a consumer. To effectuate the consumer's ability to dictate how the ingredients are to be combined, a consumer can select the ingredients mixing ratio with respect to water or other ingredients and/or the total volume of each of the ingredients to add, and/or the portion of the final product that should be composed of a particular ingredient.

Block 710 is followed by block 712, in an input is received from the consumer to adjust the sweetener level, flavor, carbonation level, and/or adjust other formulation factors. In the embodiment shown, a processor or controller, such as 106 in FIG. 1, can prompt a consumer to input or otherwise select one or more formulation factors from the displayed ingredient list. For example, a consumer can utilize a user interface associated with a product dispenser, such as user interface 112, to provide select one or more formulation factors from the displayed ingredient list. Formulation factors can include, but are not limited to, sweetener level, flavor, and carbonation level.

Block 712 is followed by block 714, in which the customized product is dispensed to the consumer. In the embodiment shown, a processor or controller, such as 106 in FIG. 1, associated with the product dispenser, such as 102A, can allow the consumer to dispense a desired customized product.

The method 700 ends after block 714.

In one embodiment, a consumer can be allowed to select a product from a menu of product choices or make his or her own product formulation. In this regard, a consumer can make his or her own product formulation by selecting one or more ingredients from an ingredient list, and adjusting various formulation parameters or factors including, but not limited to, sweetener levels, flavor, carbonation levels, and/or adjusting other formulation parameters or factors.

Figure 8:
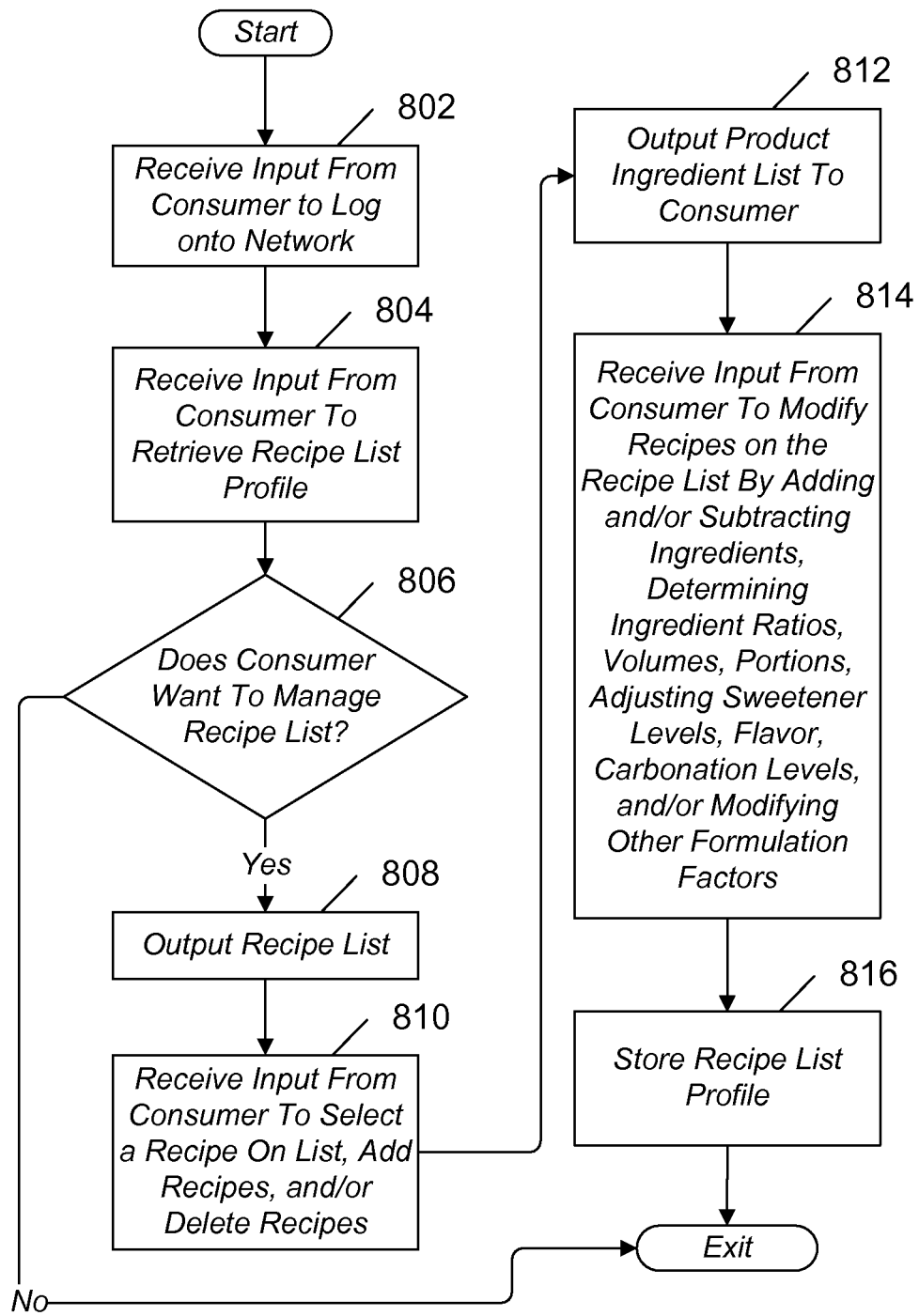
FIG. 8 illustrates one example method of allowing a consumer to use a website to manage a recipe list profile in accordance with an embodiment of the invention.

Referring to FIG. 8, an example of a method 800 of allowing a consumer to use a website to manage a recipe list profile is illustrated. The method 800 begins in block 802. In block 802, an input is received from a consumer to log on to a refreshment network. In this embodiment, a consumer can log on to a network, such as network 104 in FIG. 1, via a client-type device or wireless communication device, such as 214A-214C in FIG. 2. In one embodiment, the network can be a refreshment network or a website in which one or more consumers can retrieve, manage, and create a recipe list profile. An example of a suitable network can be MYCOKEREWARDS.COM.

Block 802 is followed by block 804, in which an input is received from the consumer to retrieve his or her recipe list profile. In the embodiment shown, a local and/or remote server in FIG. 1, associated with the product dispenser, such as 102A, can retrieve a file, such as a recipe list profile, associated with the consumer. The file or receipt list profile can be stored in an associated memory or data storage device, such as 110. For example, a file or recipe list profile can be a file that is updated with a list of products associated with a particular consumer. A recipe list profile can include, but is not limited to, standard products, brand name products, and customized products. A customized product can be created or otherwise formulated by a consumer. In one embodiment, a local and/or remote server or data processing resource, such as 126, can retrieve a file, such as a recipe list profile, associated with the consumer. The controller, such as 106, can obtain the file or recipe list profile from the local and/or remote server or data processing resource, such as 126. In any instance, the consumer is allowed to retrieve his or her recipe list profile.

Block 804 is followed by decision block 806, in which a determination is made as to whether the consumer wants to manage his or her recipe list profile. If the determination is in the affirmative, that is, the consumer wants to manage their recipe list profile, then the method 800 continues at block 808. If the determination is in the negative, that is, the consumer does not want to manage his or her recipe list profile, then the method 800 ends. In the embodiment shown, a local and/or remote server or data processing resource, such as 126 in FIG. 1, can determine whether the consumer wants to manage his or her recipe list profile. For example, the data processing resource, such as 126, can determine whether the consumer wants to manage his or her recipe list profile by comparing an input or selection from the consumer via a user interface associated with a client-type device or wireless communication device, such as 214A-214C in FIG. 2. The user interface can provide one or more options for a consumer to select from including an indication to manage a recipe list profile. The data processing resource, such as 126, can determine whether the input or selection corresponds to an indication the consumer wants to manage his or her recipe list profile.

In block 808, the consumer's recipe list profile is output. In the embodiment shown, a local and/or remote server or data processing resource, such as 126 in FIG. 1, associated with the product dispenser, such as 102A, can facilitate the output or otherwise display a consumer's recipe list profile via a user interface associated with any client-type or wireless communication device, such as 214A-214C. A recipe list profile can include, but is not limited to, standard products, brand name products, and customized products. A customized product can be created or otherwise formulated by a consumer.

Block 808 is followed by block 810, in which an input is received from the consumer to select a recipe from his or her recipe list profile. In the embodiment shown, a local and/or remote server or data processing resource, such as 126 in FIG. 1, can provide a consumer with one or more options to select at least one recipe from the consumer's recipe list profile. For example, the data processing resource, such as 126, can provide the consumer access via a user interface associated with a client-type device or wireless communication device, such as 214A-214C. The user interface can provide one or more options for a consumer to select from including options to add, delete, or edit recipes in the recipe list profile.

Block 812 is followed by block 812, in which a total list of available ingredients is displayed to the consumer. In the embodiment shown, a local and/or remote server or data processing resource, such as 126 in FIG. 1, associated with the product dispenser, such as 102A, can facilitate the output or otherwise display an available list of ingredients to the consumer via a user interface associated with any client-type or wireless communication device, such as 214A-214C. A total list of ingredients can include a list of some or all ingredients available from the product dispenser that can be combined to formulate one or more standard or customized products.

Block 812 is followed by block 814, in which an input is received from the consumer to modify the recipes of the consumer's recipe list profile by adding and/or subtracting ingredients. In the embodiment shown, a local and/or remote server or data processing resource, such as 126 in FIG. 1, can provide a consumer with options to modify at least one recipe from the consumer's recipe list profile. For example, the data processing resource, such as 126, can provide the consumer access via a user interface associated with a client-type device or wireless communication device, such as 214A-214C. The user interface can provide one or more options for a consumer to modify at least one recipe including, but not limited to, determining the ratios, volumes, and/or portions of ingredients, as well as adjust the sweetener level, flavor, carbonation level, and/or modify other formulation factors to create a customized product formulation.

Block 814 is followed by block 816, in which the recipe list profile is stored. In the embodiment shown, a local and/or remote server or data processing resource, such as 126 in FIG. 1, associated with the product dispenser, such as 102A, can store the recipe list profile associated with the consumer. For example, upon receipt of a store command from a consumer, the data processing resource, such as 126, can store the product list profile in an associated memory or data storage device, such as 110. The product list profile can be retrieved at a later time by the data processing resource, such as 126. In another embodiment, a consumer's recipe list profile can also be saved in a memory associated with a wireless data processing device, such as 214A-214C, and/or other storage media for use at a product dispenser, such as 102A. In any instance, the consumer is allowed to save the recipe list profile.

The method 800 ends after block 816.

In one embodiment, a consumer can use a website to manage a recipe list profile. In this regard, the consumer can log on, retrieve their recipe list profile, and manage their recipe list profile. Such management of their recipe list profile can include adding, modifying, and/or deleting customized products from the list. In operation, the consumer can formulate products from a standard product menu list and/or create a product from scratch by mixing individual ingredients from an ingredient list. In addition, the consumer can modify products in the recipe list by adjusting sweetener levels, flavor, carbonation level, and/or adjusting other formulation factors.

Figure 9:
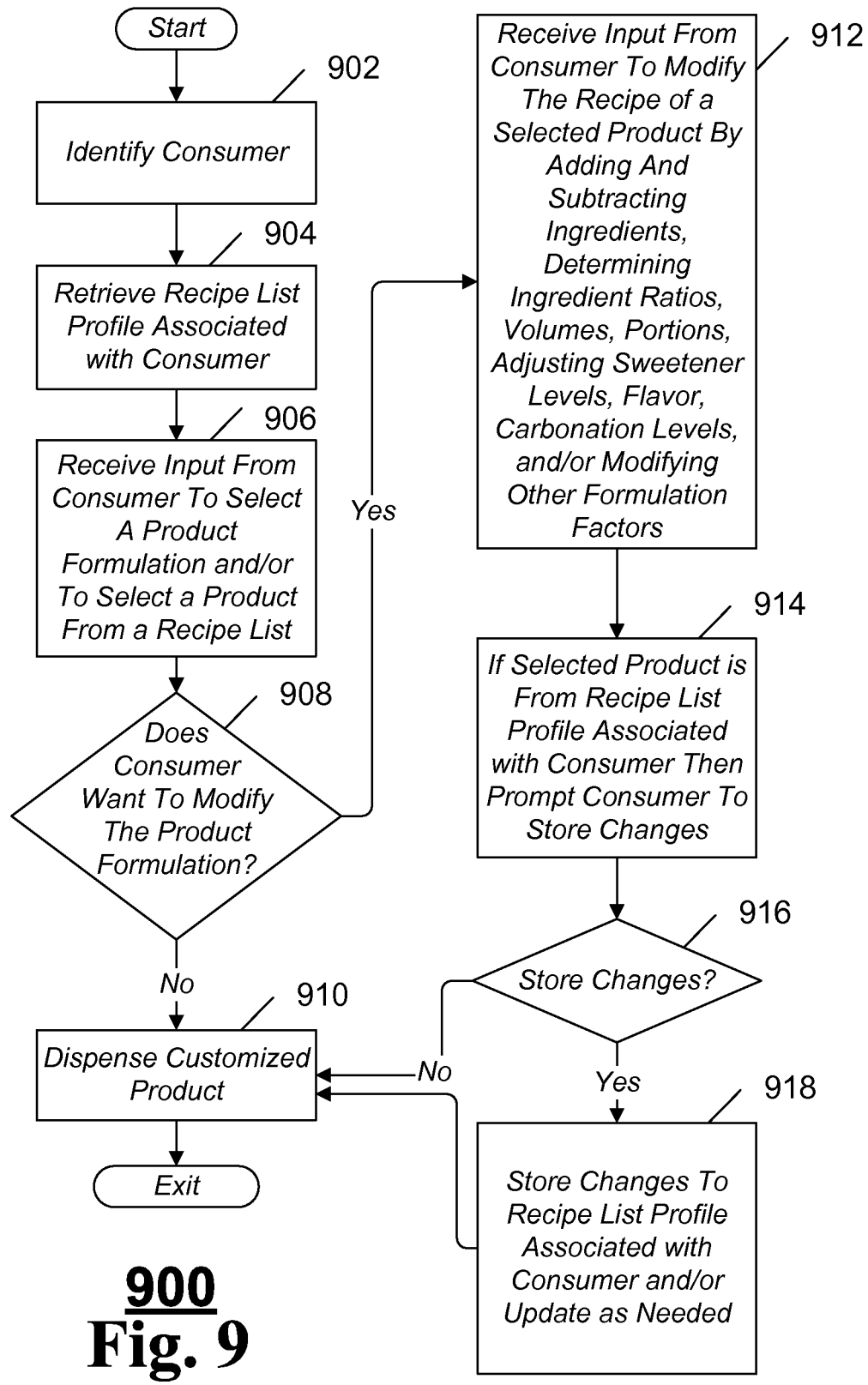
FIG. 9 illustrates one example method of allowing a consumer to choose between a standard product menu and their recipe list profile in accordance with an embodiment of the invention.

Referring to FIG. 9, an example method 900 of allowing a consumer to choose between a standard product menu and his or her recipe list profile is illustrated. The method 900 begins in block 902. In block 902, a consumer is identified. In this embodiment, a product dispenser, such as 102A in FIG. 1, can receive or otherwise obtain identification information associated with a consumer. Based at least in part on the identification information, a processor or controller, such as 106, associated with the product dispenser, such as 102A, can identify the consumer by way of an identification reader/scanner device, such as 106A. Such consumer identification can be by RFID, token, card, loyalty card, personal identification code, PIN, a consumer wireless data processing device, and/or by way of other types and kinds of identification devices or methods as may be required and/or desired in a particular embodiment.

Block 902 is followed by block 904, in which the product dispenser retrieves the consumer's recipe list profile. In the embodiment shown, a processor or controller, such as 106 in FIG. 1, associated with the product dispenser, such as 102A, can transmit identification data to a local and/or remote server or data processing resource, such as 126. Based at least in part on the identification data, the local and/or remote server or data processing resource, such as 126, can obtain or otherwise locate a recipe list profile associated with the consumer. In one embodiment, a processor or controller, such as 126, may access an associated memory or data storage device, such as 110, to obtain or otherwise locate a recipe list profile associated with the consumer. A recipe list profile can include, but is not limited to, a historical listing of some or all prior or past products a particular consumer has requested, ordered, dispensed, or otherwise received from one or more product dispensers or other types of dispensers or devices. In any instance, a product dispenser can data communicate locally and/or remotely with a server or data processing resource to obtain the consumer's recipe list profile.

Block 904 is followed by block 906, in which an input is received from the consumer to select a standard product formulation from a product menu or select a product from the consumer's customized recipe list profile. In the embodiment shown, a processor or controller, such as 106 in FIG. 1, associated with the product dispenser, such as 102A, can allow the consumer to select a standard product formulation from a product menu or select a product from the consumer's customized recipe list profile. For example, the product dispenser, such as 102A, can provide one or more options via an associated user interface, such as 112, for the consumer to select between a standard product formulation from a product menu or select a product from the consumer's customized recipe list profile. The consumer may select a product formulation or product via a user interface associated with the product dispenser, such as user interface 112.

Block 906 is followed by decision block 908, in which a determination is made as to whether the consumer wants to modify the selected product formulation. If the determination is in the affirmative, that is, the consumer wants to modify the product formulation, then the method 900 continues at block 912. If the determination is in the negative, that is, the consumer does not want to modify the product formulation, then method 900 continues at block 910. In the embodiment shown, a processor or controller, such as 106 in FIG. 1, associated with the product dispenser, such as 102A, can determine whether the consumer wants to modify the selected product formulation. For example, the processor or controller, such as 106, can prompt the consumer to receive a consumer input or selection via a user interface, such as 112, and determine whether the consumer's subsequent input or selection corresponds to whether the consumer wants to modify the selected product formulation.

In block 910, the customized product is dispensed to the consumer. In the embodiment shown, a processor or controller, such as 106 in FIG. 1, associated with the product dispenser, such as 102A, can allow the consumer to dispense a desired customized product.

The method 900 ends after block 910.

Referring to block 912, an input is received from the consumer to modify the recipe of the selected product by adding and/or subtracting ingredients. In the embodiment shown, a processor or controller, such as 106 in FIG. 1 associated with the product dispenser, such as 102A, can permit a consumer to modify the recipe of the selected product by adding and/or subtracting ingredients. For example, a processor or controller, such as 106, can provide a prompt for the consumer to modify the recipe of the selected product by adding and/or subtracting ingredients via an output device, such as a user interface, for instance 112. In this example, a consumer can modify one or more formulation parameters and factors including, but not limited to, determining ingredient ratios, volumes, and/or portion of ingredients, as well as adjust the sweetener level, flavor, carbonation level, and/or modify other formulation factors to create a customized product formulation. The processor or controller, such as 106, associated with the product dispenser, such as 102A, can receive any number of modifications from the consumer via the user interface, such as 112. In any instance, the consumer is allowed to modify the recipe of the selected product by adding and/or subtracting ingredients.

Block 912 is followed by block 914, in which if the selected product is from the consumer's recipe list profile, then the consumer is prompted as to whether to save the changes. In the embodiment shown, a processor or controller, such as 106 in FIG. 1, associated with the product dispenser, such as 102A, can determine whether the selected product is from the consumer's recipe list profile, and if so, then prompt the consumer is prompted as to whether to save the changes to the consumer's recipe list profile. For example, the processor or controller, such as 106, can receive a consumer input or selection via a user interface, such as 112, and determine whether the input or selection corresponds to whether to store the changes to the consumer's recipe list profile.

Block 914 is followed to decision block 916, in which a determination is made as to whether the consumer wants to save changes to his or her recipe list profile. If the determination is in the affirmative, that is, the consumer wants to save changes to their recipe list profile, then the method 900 continues to block 918. If the determination is in the negative, that is, the consumer does not want to save changes to his or her recipe list profile, then the method 900 continues to block 910. In this embodiment, the processor or controller, such as 106, can determine whether the consumer wants to save changes to his or her recipe list profile by way of receipt of a consumer input or selection via a user interface, such as 112.

In block 918, changes to the consumer recipe list profile are saved, and as needed, data communicated to a data processing resource. In the embodiment shown, a processor or controller, such as 106 in FIG. 1, associated with the product dispenser, such as 102A, can update the recipe list profile associated with the consumer with any changes made by the consumer. For example, the recipe list profile can be updated and stored in an associated memory or data storage device, such as 110. In one embodiment, a local and/or remote server or data processing resource, such as 126, can update the recipe list profile associated with the consumer and store the profile in a memory or data storage device, such as 110. In any instance, changes to the consumer recipe list profile are saved, and as needed, data communicated to a data processing resource.

Referring to block 910, the desired customized product is dispensed to the consumer. In the embodiment shown, a processor or controller, such as 106 in FIG. 1, associated with the product dispenser, such as 102A, can allow the consumer to dispense a desired customized product.

In one embodiment, a consumer may want to choose between standard products such as COCA-COLA™, DIET COCA-COLA™, FANTA ORANGE™, etc. and his or her recipe list profile products. As such, a product dispenser can retrieve the consumer's recipe list profile and then offer the consumer a choice between standard product menu products and his or her customized recipe list profile products.

Figure 10:
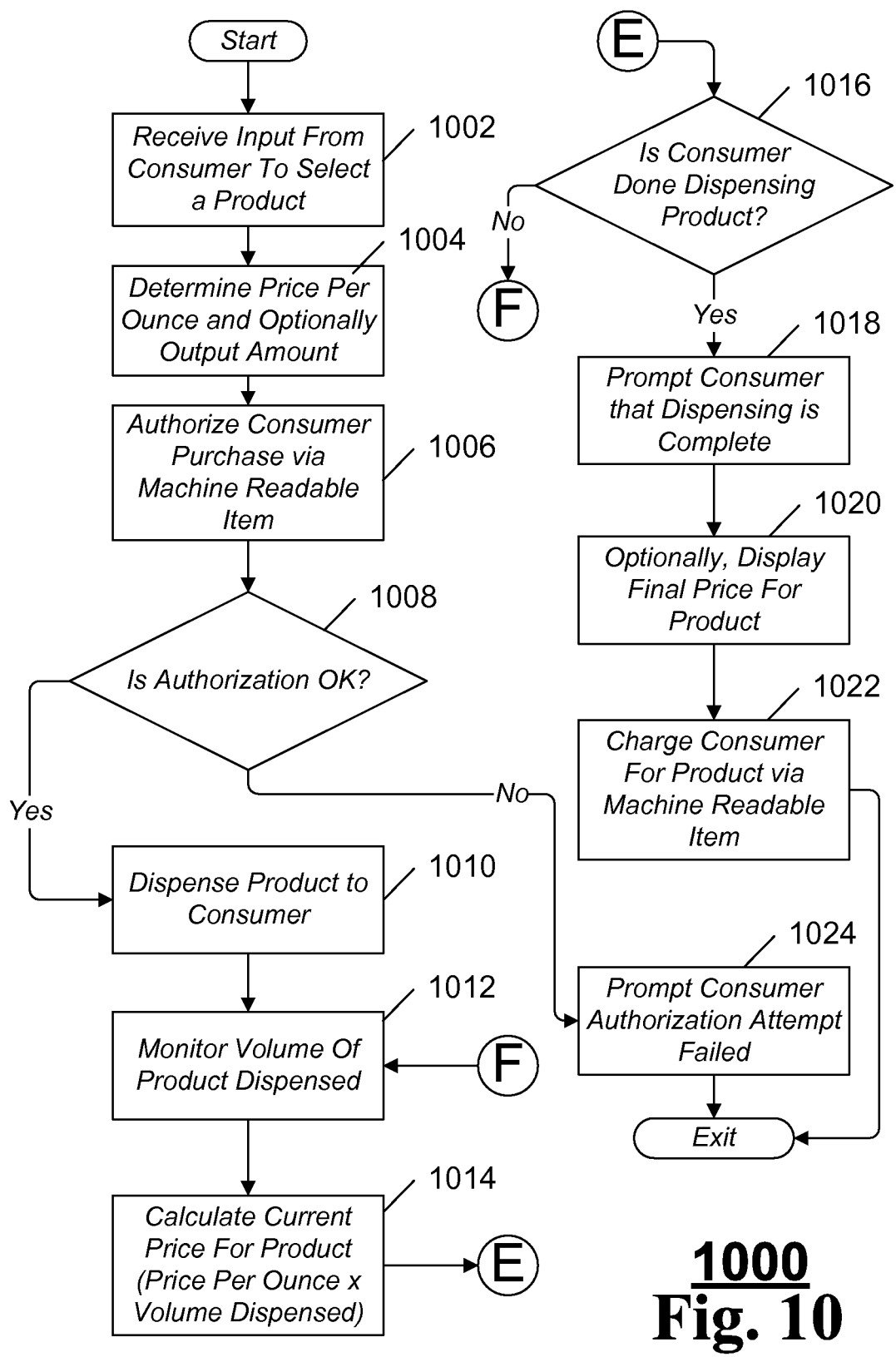
FIG. 10 illustrates one example method of charging for a product based on the volume of product dispensed and paying for the product by way of cashless payment implement in accordance with an embodiment of the invention.

Referring to FIG. 10, an example method 1000 of charging for a product based on the volume of product dispensed and paying for the product by way of cashless payment implement is illustrated. The method 1000 begins in block 1002. In block 1002, an input is received from the consumer to select a product. In the embodiment shown, a consumer can enter data via a user interface, such as 112 in FIG. 1, such as selection of an indicator corresponding to a product, such as DIET CHERRY COKE™. In other embodiments, other products can be selected by a consumer, or other data associated with one or more product selections can be entered by a consumer. In one embodiment, a product selection can be effectuated by way of a graphical user interface associated with a product dispenser, such as user interface 112.

Block 1002 is followed by block 1004, in which the PRICE PER OUNCE is determined and optionally displayed. In the embodiment shown, a processor or controller, such as 106 in FIG. 1, can determine a PRICE PER OUNCE or other cost per unit for a selected product. For example, the controller, such as 106, can communicate with an associated memory or data storage device, such as 110, to determine a cost and size for the selected product. The controller, such as 106, can optionally display the PRICE PER OUNCE or other cost per unit of the selected product via a user interface, such as 112, associated with a product dispenser, such as 102A. In one embodiment, a processor or controller, such as 106, can communicate with a local and/or remote server or data processing resource, such as 126, to determine a PRICE PER OUNCE or other cost per unit for a selected product. In any instance, the PRICE PER OUNCE is determined and optionally displayed.

Block 1004 is followed by block 1006, in which the consumer purchase is authorized by way of a machine readable item. In the embodiment shown, a processor or controller, such as 106 in FIG. 1, associated with the product dispenser, such as 102A, can facilitate and authorize a payment from a cashless implement, such as a machine readable item, associated with a consumer. For example, the processor or controller, such as 106, can receive payment information from a cashless implement, such as a machine readable item, associated with a consumer. The payment information can include, but is not limited to, a credit or debit card or account number. In one embodiment, an option can be provided to a consumer to purchase the product via a client-type device or a wireless communication device, such as 214A-214C in FIG. 2. In this particular embodiment, the consumer can pay for the selected product by authorizing payment via the client-type device or a wireless communication device, such as 214A-214C, and the payment can be received via an associated network, such as 104. In any instance, the consumer provided cashless implement is accepted and the product purchase is authorized.

Block 1006 is followed by decision block 1008, in which a determination is made as to whether the payment authorization was successful. If the determination is in the affirmative, that is, the authorization attempt was 'OK', then method 1200 continues at block 1210. If the determination is in the negative, that is, the authorization attempt was not 'OK', then method 1200 continues at block 1224. In the embodiment shown, a processor or controller, such as 106 in FIG. 1, associated with the product dispenser, such as 102A, can determine whether the payment authorization was successful. For example, the processor or controller, such as 106, can receive an authorization message from a local and/or remote server or data processing resource, such as 126. The authorization message can include, but is not limited to, an authorization code, a transaction code, or a message that the transaction is 'OK'.

In block 1010, the selected product is dispensed. In the embodiment shown, a processor or controller, such as 106 in FIG. 1, associated with the product dispenser, such as 102A, can allow the consumer to dispense a desired product.

Block 1010 is followed by block 1012, in which the dispensed product volume is monitored. In the embodiment shown, a processor or controller, such as 106, can monitor and determine a product volume, such as a BEVERAGE VOLUME, or other unit of measure for a selected product. For example, the controller, such as 106, can communicate with an associated flowmeter or device to determine a product volume, such as a BEVERAGE VOLUME, or other unit of measure for the selected product. In one embodiment, a product volume, such as a BEVERAGE VOLUME, can be used in a calculation formula, such as the FINAL BEVERAGE COST calculation formula, and to limit the amount of product dispensed as not to exceed an authorization upper limit, and/or for other purposes, as may be required and/or desired in a particular embodiment.

Block 1012 is followed by block 1014, in which the product price is calculated. In the embodiment shown, a processor or controller, such as 106, can determine a price, such as a CURRENT PRICE, or other price for the selected product. In one embodiment, a calculation can be based in part on a formula that includes the PRICE PER OUNCE (or other volume units) multiplied by the dispensed BEVERAGE VOLUME.

Block 1014 is followed by decision block 1016, in which a determination is made as to whether the consumer is done dispensing the selected product. If the determination is in the affirmative, that is, the consumer is done dispensing the selected product, then the method 1000 continues at block 1018. If the determination is in the negative, that is, the consumer is not done dispensing the selected product, then the method 1000 continues at block 1012. In the embodiment shown, a processor or controller, such as 106 in FIG. 1, associated with the product dispenser, such as 102A, can determine whether the consumer is done dispensing the selected product. For example, the processor or controller, such as 106, can detect when a predefined amount of selected product has been dispensed, or when the dispenser has ceased to dispense the selected product, and thus determine whether the consumer is done dispensing the selected product.

In block 1018, the consumer is prompted that the product dispensing is complete. In the embodiment shown, a processor or controller, such as 106 in FIG. 1, associated with the product dispenser, such as 102A, can inform the consumer that the product dispensing is complete. For example, after the consumer requests a product fill and the consumer completes the filling of the selected product, the controller, such as 106, can provide a communication, such as a message via a user interface associated with the product dispenser, such as user interface 112, that the product dispensing is complete.

Block 1018 is followed by block 1020, in which the final product price is optionally determined and displayed. In the embodiment shown, a processor or controller, such as 106, can determine a final product price, such as a FINAL BEVERAGE COST, or other cost per unit for a selected product. For example, the controller, such as 106 in FIG. 1, can communicate with an associated memory or data storage device, such as 110, to determine a final product price, such as a FINAL BEVERAGE COST, for the selected product. The controller, such as 106, can optionally display the final product price, such as a FINAL BEVERAGE COST, or other cost of the selected product via a user interface, such as 112, associated with a product dispenser, such as 102A. In one embodiment, a processor or controller, such as 106, can communicate with a local and/or remote server or data processing resource, such as 126, to determine a FINAL BEVERAGE COST or other cost for a selected product. In any instance, the FINAL BEVERAGE COST is optionally determined and displayed.

Block 1022 is followed by block 1022, in which the consumer's machine readable item is charged. In the embodiment shown, a processor or controller, such as 106 in FIG. 1, associated with the product dispenser, such as 102A, can facilitate and authorize a payment from a cashless implement, such as a machine readable item, associated with a consumer. For example, the processor or controller, such as 106, can receive payment information for the FINAL BEVERAGE COST from a cashless implement, such as a machine readable item, associated with a consumer. The payment information can include, but is not limited to, a credit or debit card or account number. In one embodiment, an option can be provided to a consumer to purchase the product via a client-type device or a wireless communication device, such as 214A-214C in FIG. 2. In this particular embodiment, the consumer can pay for the selected product by authorizing payment via the client-type device or a wireless communication device, such as 214A-C, and the payment can be received via an associated network, such as 104. In one embodiment, a charging the consumer's cashless implement can include, but is not limited to, charging a consumer's credit card, hotel room, prepaid account, and/or charging other types/and kinds of accounts associated with the consumer's cashless implement, as may be required and/or desired in a particular embodiment. In any instance, the consumer's cashless implement is charged.

The method 1000 ends after block 1022.

Referring to block 1024, the consumer is prompted that the authorization attempt failed. In the embodiment shown, a processor or controller, such as 106 in FIG. 1, associated with the product dispenser, such as 102A, can determine the consumer cashless implement authorization was not successful or otherwise failed. For example, the processor or controller, such as 106, can receive an authorization message from a local and/or remote server or data processing resource, such as 126. The authorization message can include, but is not limited to, a failure code, a transaction code, an error message, an insufficient funds message, or a message that the transaction was not 'OK'.

The method 1000 ends after block 1024.

In one embodiment, a consumer can use a cashless implement to activate a product dispenser. Once activated, the product dispenser can determine a PRICE PER OUNCE for a particular product. The TOTAL BEVERAGE COST for the product can be calculated based on the VOLUME OF BEVERAGE DISPENSED in ounces multiplied by the PRICE PER OUNCE. In this regard, the cost of the product can be based on volume dispensed not on a fixed fee for a cup size such as small, medium, or large. Once a TOTAL BEVERAGE COST is determined, a consumer's cashless implement can be charged for the product to effectuate payment. A cashless implement can include, but is not limited to, a machine readable item, a cashless loyalty icon, a prepaid card, a credit card, a hotel room key, a stored value account, a wireless device, and/or other types and/or kinds of cashless implements, as may be required and or desired in a particular embodiment. In one embodiment, a PRICE PER OUNCE can alternatively be a PRICE PER MILLILITER or any other unit of measurement, as may be required and or desired in a particular embodiment. In addition, other pricing and costing formulas can be utilized as necessary to produce a PRICE PER VOLUME and/or a TOTAL BEVERAGE COST based on dispensed volume.

Referring to FIG. 11, an example method 1100 of charging for a product based on the volume of product dispensed and paying for the product by way of prepayment is illustrated. The method 1100 begins in block 1102. In block 1102, an input is received from a consumer to prepay for a product establishing a MAX BEVERAGE COST. In the embodiment shown, a processor or controller, such as 106 in FIG. 1, associated with the product dispenser, such as 102A, can prompt the consumer to prepay for a product which can establish a MAX BEVERAGE COST value. For example, the processor or controller, such as 106, can prompt the consumer to prepay via any monetary or financial transaction device or method, such as receiving a credit or debit card or account number. A prepayment for a selected product can be by way of cashless or currency based transaction. In one embodiment, an option can be provided to a consumer to prepay for the product and/or promotional offer via a client-type device or a wireless communication device, such as 214A-214C in FIG. 2. In this particular embodiment, the consumer can prepay for the selected product by authorizing payment via the client-type device or a wireless communication device, such as 214A-214C, and the payment can be received via an associated network, such as 104. In any instance, the consumer is allowed to prepay for a product establishing a MAX BEVERAGE COST.

Block 1102 is followed by block 1104, in which an input is received from the consumer to select a product. In the embodiment shown, a consumer can enter data via a user interface, such as 112 in FIG. 1, such as selection of an indicator corresponding to a product, such as DIET CHERRY COKE™. In other embodiments, other products can be selected by a consumer, or other data associated with one or more product selections can be entered by a consumer. In one embodiment, a product selection can be effectuated by way of a graphical user interface associated with a product dispenser, such as user interface 112.

Block 1104 is followed by block 1106, in which a price per ounce is determined and optionally displayed. In the embodiment shown, a processor or controller, such as 106 in FIG. 1, can determine a PRICE PER OUNCE or other cost per unit for a selected product. For example, the controller, such as 106, can communicate with an associated memory or data storage device, such as 110, to determine a cost and size for the selected product. The controller, such as 106, can optionally display the PRICE PER OUNCE or other cost per unit of the selected product via a user interface, such as 112, associated with a product dispenser, such as 102A. In one embodiment, a processor or controller, such as 106, can communicate with a local and/or remote server or data processing resource, such as 126, to determine a PRICE PER OUNCE or other cost per unit for a selected product. In any instance, the PRICE PER OUNCE is determined and optionally displayed.

Block 1106 is followed by block 1108, in which the selected product is dispensed. In the embodiment shown, a processor or controller, such as 106 in FIG. 1, associated with the product dispenser, such as 102A, can allow the consumer to dispense a desired product.

Block 1108 is followed by block 1110, in which the dispensed product volume is monitored. In the embodiment shown, a processor or controller, such as 106, can monitor and determine a BEVERAGE VOLUME or other unit of measure for a selected product. For example, the controller, such as 106, can communicate with an associated flowmeter or device to determine a BEVERAGE VOLUME or other unit of measure for the selected product. In one embodiment, the BEVERAGE VOLUME can be used in the FINAL BEVERAGE COST calculation formulas, and to limit the amount of product dispensed as not to exceed the MAX BEVERAGE COST upper limit, and/or for other purposes, as may be required and/or desired in a particular embodiment. In one embodiment, the BEVERAGE VOLUME can be used in the FINAL BEVERAGE COST calculation formulas, and to limit the amount of product dispensed as not to exceed the MAX BEVERAGE COST upper limit, and/or for other purposes, as may be required and/or desired in a particular embodiment.

Block 1112 is followed by block 1112, in which the current product price is calculated. In the embodiment shown, a processor or controller, such as 106, can determine a BEVERAGE CURRENT PRICE or other price for the selected product. In one embodiment, a calculation can be based in part on a formula that includes the PRICE PER OUNCE (or other volume units) multiplied by the dispensed BEVERAGE VOLUME.

Block 1112 is followed by decision block 1114, in which a determination is made as to whether the consumer has reached the MAX BEVERAGE COST. If the determination is in the affirmative, that is, the consumer has reached the MAX BEVERAGE COST, then the method 1100 continues at block 1120. If the determination is in the negative, that is, the consumer has not reached the MAX BEVERAGE COST, then the method 1100 continues at decision block 1116. In the embodiment shown, a processor or controller, such as 106, can determine whether the MAX BEVERAGE COST or other cost per unit for a selected product is reached or otherwise exceeded. For example, the controller, such as 106, can communicate with an associated memory or data storage device, such as 110, to compare a MAX BEVERAGE COST for the selected product with the BEVERAGE CURRENT PRICE.

In decision block 1116, a determination is made as to whether the consumer is done dispensing the selected product. If the determination is in the affirmative, that is, the consumer is done dispensing the selected product, then the method 1100 continues at block 1118. If the determination is in the negative, that is, the consumer is not done dispensing the selected product, then the method 1100 continues at block 1110. In the embodiment shown, a processor or controller, such as 106 in FIG. 1, associated with the product dispenser, such as 102A, can determine whether the consumer is done dispensing the selected product. For example, the processor or controller, such as 106, can detect when a predefined amount of selected product has been dispensed, or when the dispenser has ceased to dispense the selected product, and thus determine whether the consumer is done dispensing the selected product.

In block 1118, a consumer can obtain a refund if the MAX BEVERAGE COST is greater than the calculated cost for the FINAL BEVERAGE COST. In the embodiment shown, a processor or controller, such as 106, can determine if the MAX BEVERAGE COST is greater than the calculated cost for the FINAL BEVERAGE COST, and if so, then a refund can be provided to the consumer.

Block 1118 is followed by block 1120, in which the consumer is prompted that the product dispensing is complete. In the embodiment shown, a processor or controller, such as 106 in FIG. 1, associated with the product dispenser, such as 102A, can inform the consumer that the product dispensing is complete. For example, after the consumer requests a product fill and the consumer completes the filling of the selected product, the controller, such as 106, can provide a communication, such as a message via a user interface associated with the product dispenser, such as user interface 112, that the product dispensing is complete.

Block 1120 is followed by block 1122, in which the final product price is optionally determined and displayed. In the embodiment shown, a processor or controller, such as 106 in FIG. 1, can determine a FINAL BEVERAGE COST or other cost per unit for a selected product. For example, the controller, such as 106, can communicate with an associated memory or data storage device, such as 110, to determine a FINAL BEVERAGE COST for the selected product. The controller, such as 106, can optionally display the FINAL BEVERAGE COST or other cost of the selected product via a user interface, such as 112, associated with a product dispenser, such as 102A. In one embodiment, a processor or controller, such as 106, can communicate with a local and/or remote server or data processing resource, such as 126, to determine a FINAL BEVERAGE COST or other cost for a selected product. In any instance, the FINAL BEVERAGE COST is optionally determined and displayed.

The method 1100 ends after block 1122.

In one embodiment, a consumer can prepay for a product. In this regard, a MAX BEVERAGE COST equal to the prepayment can be determined. The consumer can then operate the product dispenser dispensing a product in a PRICE PER OUNCE model. In such a model the consumer can dispense a TOTAL BEVERAGE VOLUME which in part determines a TOTAL BEVERAGE COST up the MAX BEVERAGE COST, wherein the TOTAL BEVERAGE COST is the TOTAL BEVERAGE VOLUME multiplied by the PRICE PER OUNCE.

In one embodiment, a dispensed TOTAL BEVERAGE VOLUME is limited by formula and PRICE PER OUNCE to the prepaid MAX BEVERAGE COST amount. Optionally, should the consumer not dispense a sufficient volume of product, such that the MAX BEVERAGE COST is not achieved a partial refund can be calculated and paid back to the consumer.

The capabilities of various embodiments of the invention can be implemented in software, firmware, hardware or some combination thereof.

As one example, one or more aspects of the invention can be included in an article of manufacture (e.g., one or more computer program products) having, for instance, computer usable media. The media has embodied therein, for instance, computer readable program code means for providing and facilitating the capabilities of the embodiment of the invention. The article of manufacture can be included as a part of a computer system or sold separately. One example of a suitable article of manufacture is a consumer interaction engine or module, such as 114 described in FIG. 1.

Additionally, at least one program storage device readable by a machine, tangibly embodying at least one program or set of instructions executable by the machine to perform the capabilities of the embodiment of the invention can be provided. One example of a suitable program storage device readable by machine is a memory or data storage device, such as 110 described in FIG. 1.

The flow diagrams depicted herein are examples. There may be many variations to these diagrams or the elements (or operations) described therein without departing from the scope of the claimed invention. For instance, the elements may be performed in a differing order, or elements may be added, deleted or modified. All of these variations are considered a part of the claimed invention.

While embodiments of the invention have been described, it will be understood that those skilled in the art, both now and in the future, may make various improvements and enhancements which fall within the scope of the claims which follow. These claims should be construed to maintain the proper protection for the invention first described.

The claimed invention is:

1. A beverage dispenser comprising:
a user interface operable to interact with a consumer and receive at least one input from the consumer; and
a controller comprising a set of instructions operable to:
receive, from the consumer, a selection of a post-mix beverage with a fixed beverage formulation, the beverage formulation comprising at least one concentrate, a liquid sweetener, and a diluent;
receive, from the consumer, a request to modify the beverage formulation;
present via the user interface, in response to the request, options to modify the beverage formulation through the addition of ingredients to the beverage formulation;
present, via the user interface, options to modify a formulation factor of the beverage formulation, the formulation factor comprising a liquid sweetener proportion or a flavor proportion;
receive, from the consumer, modifications to the beverage formulation or modifications to the formulation factor;
select, based at least in part on the modifications to the beverage formulation or modifications to the formulation factor, at least one dispensing concentrate from a plurality of concentrates, the at least one dispensing concentrate configured to be mixed with the liquid sweetener at or before dispensing; and
dispense a custom beverage to the consumer via at least one nozzle at the beverage dispenser based at least in part on the consumer modifications received by the dispenser from the consumer, wherein the custom beverage is mixed about the at least one nozzle of the beverage dispenser during dispensing.

2. The dispenser of claim 1, wherein the request from the consumer to modify the beverage formulation comprises at least one of information received via the user interface associated with the product dispenser, a scanned machine readable code, information received from a RFID tag, a communication received from a client-type device, or a communication received from a wireless communication device.

3. The dispenser of claim 1, wherein the controller further comprises a set of instructions operable to receive information associated with the consumer, wherein the information comprises previously stored formulation factors.

4. The dispenser of claim 3, wherein information associated with the consumer further comprises identification information associated with the consumer, and the controller further comprises a set of instructions operable to retrieve a user profile associated with the consumer.

5. The dispenser of claim 1, wherein the controller further comprises a set of instructions operable to present, via the user interface, options to add at least one nutritional additive to the beverage formulation.

6. The dispenser of claim 1, wherein the controller further comprises a set of instructions operable to store one or more formulation factors input by a consumer.

7. The dispenser of claim 1, wherein information associated with the consumer comprises a code received from the consumer, and the set of instructions is further operable to retrieve a profile associated with the consumer.

8. The dispenser of claim 1, wherein the controller further comprises a set of instructions operable to store a recipe associated with the dispensed custom beverage in a profile associated with the consumer.

9. The dispenser of claim 1, wherein the controller further comprises a set of instructions operable to:
provide consumer access to a profile associated with the consumer over a network; and
receive one or more formulation factors from the consumer via the network.

10. A method for operating a beverage dispenser, comprising:
- receiving a selection from a consumer of a post-mix beverage with a fixed beverage formulation, the beverage formulation comprising at least one concentrate, a liquid sweetener, and a diluent;
- receiving a request from the consumer to customize the beverage formulation to dispense a custom beverage;
- in response to the request, presenting options to modify the beverage formulation through the addition of ingredients to the beverage formulation;
- presenting options to modify a formulation parameter of the selected post-mix beverage, the formulation parameters comprising at least one of a ratio of two or more ingredients, a volume, or a portion of an ingredient in the custom beverage product;
- presenting options to modify a formulation factor of the selected post-mix beverage, the formulation factors comprising at least one of a sweetener proportion, a flavor proportion, or a carbonation level of the custom beverage product;
- selecting, based at least in part on the modifications to the beverage formulation, the formulation parameters, and the formulation factors, at least one dispensing concentrate from a plurality of concentrates, the at least one dispensing concentrate configured to be mixed with the liquid sweetener at or before dispensing; and
- dispensing a custom beverage via at least one nozzle at the beverage dispenser based at least in part on the modifications received from the consumer, wherein the custom beverage is mixed about the at least one nozzle of the beverage dispenser during dispensing.

11. The method of claim 10, wherein receiving the request from the consumer to dispense the custom beverage comprises at least one of receiving information via a user interface associated with the product dispenser, scanning a machine readable code, receiving information from a RFID tag, receiving a communication from a client-type device, or receiving a communication from a wireless communication device.

12. The method of claim 10, further comprising
receiving information associated with the consumer, wherein the information comprises previously stored formulation parameters or formulation factors.

13. The method of claim 12, wherein receiving information associated with the consumer further comprises receiving a code from the consumer, and retrieving a profile associated with the consumer.

14. The method of claim 12, wherein receiving information associated with the consumer further comprises receiving identification information associated with the consumer, and retrieving a user profile associated with the consumer.

15. The method of claim 10, wherein formulation parameter further comprises at least one nutritional additive.

16. The method of claim 10, further comprising:
storing one or more formulation parameters or formulation factors input by a consumer.

17. The method of claim 10, further comprising
storing a recipe associated with the dispensed custom beverage in a profile associated with the consumer.

18. The method of claim 10, further comprising:
providing consumer access to a profile associated with the consumer over a network; and
receiving an input to one or more formulation parameters or formulation factors from the consumer.

19. A method for operating a beverage dispenser, comprising:
- receiving information associated with a consumer, the receiving comprising scanning a machine readable code;
- based at least in part on the information associated with the consumer, presenting via a user interface associated with the beverage dispenser options to modify a post-mix beverage with a fixed beverage formulation comprising at least one concentrate, a liquid sweetener, and a diluent, wherein the options to modify the post-mix beverage comprise the addition of ingredients to the beverage formulation, options to modify a formulation parameter of the post-mix beverage, the formulation parameters comprising at least one of a ratio of two or more ingredients, a volume, or a portion of an ingredient in the custom beverage product, and options to modify a formulation factor of the post-mix beverage, the formulation factors comprising a sweetener proportion or a flavor proportion; and
- dispensing the custom beverage via at least one nozzle at the beverage dispenser based at least in part on the modification options selected by the consumer, wherein the custom beverage is mixed about the at least one nozzle of the beverage dispenser during dispensing.

20. The method of claim 19, wherein receiving information associated with the consumer comprises at least one of accessing a profile associated with the consumer, receiving consumer information from a remote server or data storage device, receiving information via a user interface associated with the product dispenser, receiving information from a RFID tag, receiving a communication from a client-type device, or receiving a communication from a wireless communication device.

21. The method of claim 19, wherein formulation parameter further comprises at least one nutritional additive.

22. The method of claim 19, further comprising:
providing consumer access to a profile associated with the consumer via a network, wherein the profile comprises one or more formulation parameters or formulation factors selected by the consumer; and
storing any changes to the profile.

23. A product dispenser comprising:
- a user interface operable to interact with a consumer and receive at least one input from the consumer; and
- a controller comprising a set of instructions operable to:
  - receive information associated with the consumer;
  - based at least in part on the information associated with the consumer, present via the user interface options to customize a post-mix beverage with a fixed beverage formulation comprising at least one concentrate, a liquid sweetener, and a diluent, wherein the options to modify the post-mix beverage comprise the addition of ingredients to the beverage formulation, options to modify a formulation parameter of the post-mix beverage, the formulation parameters comprising at least one of a ratio of two or more ingredients of a custom beverage, a volume, or a portion of an ingredient in the custom beverage, and options to modify a formulation factor of the post-mix beverage, the formulation factors comprising at least one of a sweetener proportion, a flavor proportion, or a carbonation level of the custom beverage; and
  - dispense the custom beverage product via at least one nozzle at the product dispenser based at least in part on the modification options selected by the consumer, wherein the custom beverage is mixed about the at least one nozzle of the beverage dispenser during dispensing.

24. The dispenser of claim 23, wherein the controller further comprises a set of instructions operable to receive via a network information from a profile associated with the consumer, wherein the profile comprises one or more formulation parameters or formulation factors previously selected by the consumer.

* * * * *